US006397253B1

(12) United States Patent
Quinlan et al.

(10) Patent No.: US 6,397,253 B1
(45) Date of Patent: May 28, 2002

(54) METHOD AND SYSTEM FOR PROVIDING HIGH PERFORMANCE WEB BROWSER AND SERVER COMMUNICATIONS

(75) Inventors: Cian M. Quinlan; Michael L. Giroux, both of Phoenix, AZ (US)

(73) Assignee: Bull HN Information Systems Inc., Billerica, MA (US)

( * ) Notice: Subject to any disclaimer, the term of this patent is extended or adjusted under 35 U.S.C. 154(b) by 0 days.

(21) Appl. No.: 09/166,877

(22) Filed: Oct. 6, 1998

(51) Int. Cl.$^7$ ............................................. G06F 15/16
(52) U.S. Cl. ...................... 709/227; 709/217; 709/203
(58) Field of Search ................................ 709/203, 217, 709/218, 227, 228, 229, 219, 224

(56) References Cited

U.S. PATENT DOCUMENTS

| | | | |
|---|---|---|---|
| 5,754,772 A | | 5/1998 | Leaf |
| 5,754,774 A | | 5/1998 | Bittinger |
| 5,754,830 A | * | 5/1998 | Butts et al. .................. 709/227 |
| 5,778,372 A | * | 7/1998 | Cordell et al. ............... 709/218 |
| 5,784,562 A | * | 7/1998 | Diener ........................ 709/217 |
| 5,796,393 A | * | 8/1998 | MacNaughton et al. ..... 709/203 |
| 5,857,201 A | * | 1/1999 | Wright, Jr. et al. ......... 707/104 |
| 5,859,971 A | | 1/1999 | Bittinger |
| 5,867,661 A | * | 2/1999 | Bittinger et al. ............ 709/227 |
| 5,898,835 A | * | 4/1999 | Truong ........................ 709/217 |
| 5,918,009 A | * | 6/1999 | Gehani et al. ............... 709/219 |
| 5,961,601 A | * | 10/1999 | Iyengar ....................... 709/229 |
| 6,035,324 A | * | 3/2000 | Chang et al. ................ 709/203 |
| 6,035,332 A | * | 3/2000 | Ingrassia, Jr. et al. ...... 709/224 |
| 6,148,340 A | * | 11/2000 | Bittinger et al. ............ 709/224 |

OTHER PUBLICATIONS

"How to Put Mainframes on the Web", by Salvatore Salamone, Byte, Jun. 1996, pp. 53–54.
"The Last Word—Selecting Java App Servers", by Dan Kara, Object Magazine, Jun. 1998, pp. 72 and 70–71.
"Unlocking the Mainframe", by Martin Rennhackkamp, DBMS, Jun. 1997, pp. 55–56 & 58–59.

"Guaranteed Delivery", by Barry Nance, Byte, Aug. 1997, pp. 77–78, 80, 82 & 84.
"Web Components", by Dick Pountain & John Montgomery, Byte, Aug. 1997, pp. 56–60, 62, 64, 66 & 68.
"Transaction Processing On The Web", by David Matthews & Wayne Worden, Group Bull Technical Update, vol. 6, No. 3, Copyright Bull HN Information Systems Inc. & Bull S.A., 1996, pp. 11–18.
"Tools & Utilities, Transaction Screen Management, System 8, TSM8 Reference Manual, GCOS 8", Publication No. 67 A2 ED42 Rev 02, Copyright 1996 Bull HN Information Systems Inc.
"Transaction Processing, TPFF System, Software Release Bulletin, Software Release 8F01.0, Update 5, GCOS 8", Publication No. 67 A2 SA65 Rev 05, Copyright 1985, 1993 Bull SA. & Bull HN Information Systems Inc.

* cited by examiner

*Primary Examiner*—David Wiley
*Assistant Examiner*—Philip B. Tran
(74) *Attorney, Agent, or Firm*—Faith F. Driscoll; John S. Solakian

(57) ABSTRACT

A client system utilizes a standard browser component and a transaction protocol gateway (TPG) component that operatively couples to the standard browser component. The browser component initiates the utilization of new session connections and reuse of existing session connections as a function of the coding of the universal resource locators (URLs) contained in each issued request. Each URL is passed to the TPG component that examines a context field included within the URL. If the context field has been set to a first value, the TPG component opens a new session connection to the server system and records the session connection information in a persistent session table (PST) component maintained by the TPG component. If the context field has been set to a second value, then the TPG component obtains the session connection information in the PST component for the established session connection and passes the data from the browser component to the server system over the existing persistent session connection.

55 Claims, 8 Drawing Sheets

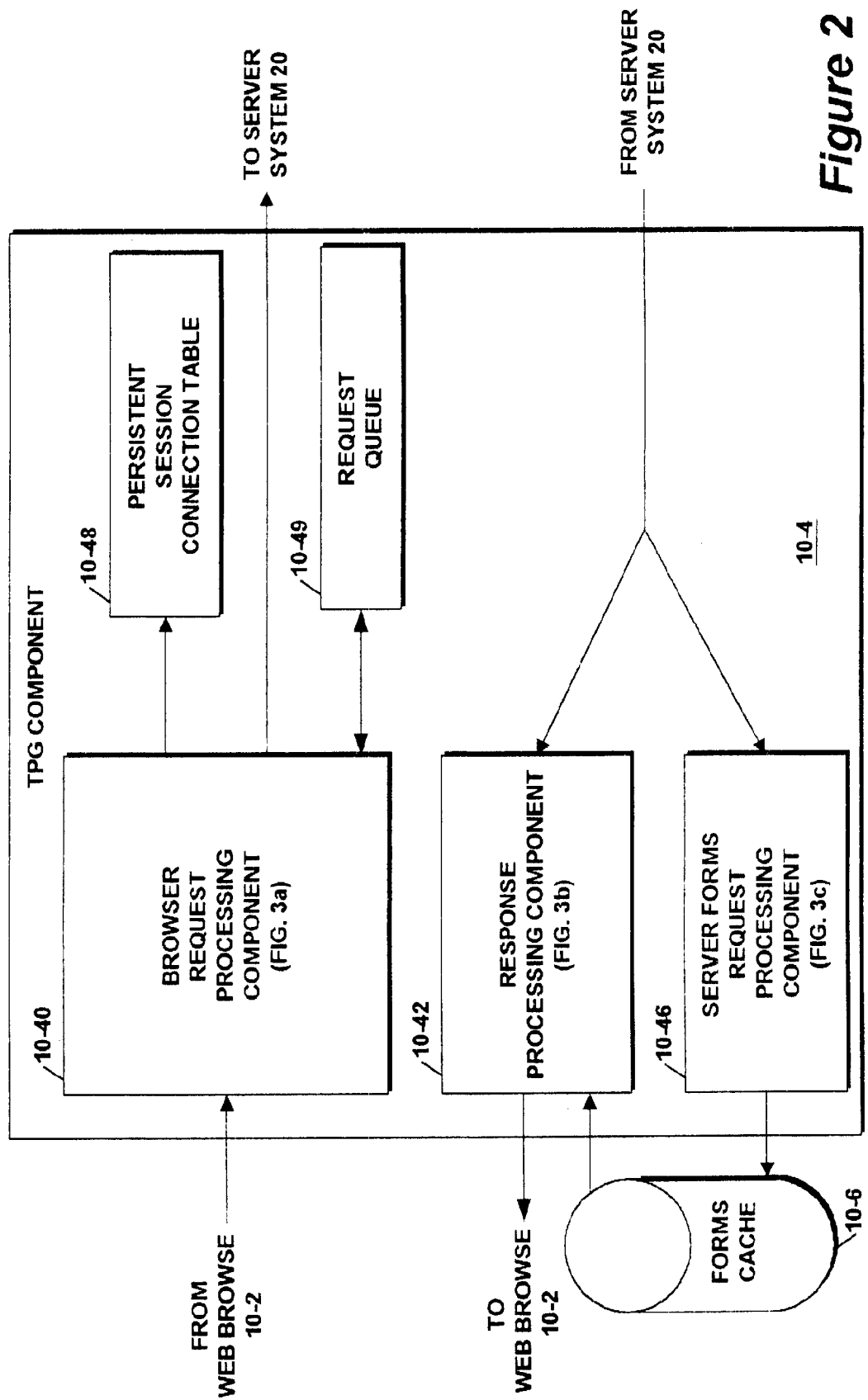

METHOD AND SYSTEM FOR PROVIDING HIGH PERFORMANCE WEB BROWSER AND SERVER COMMUNICATIONS

BACKGROUND OF THE INVENTION

1. Field of Use

The present invention relates to Internet applications and more specifically, to methods and systems for providing efficient communications between Web browser and server systems.

2. Description of Related Art

Significant changes are being made by companies in how they communicate with their customers and the types of services offered due to Web technology. One such change has been the use of a Web browser as a common front end to a mainframe or an enterprise system. In the case of IBM hosts, two basic methods have been utilized to give browsers access to such systems. These methods have been generically called native 3270 and Hypertext Markup Language (HTML) conversion. In the native 3270 method, a special browser is utilized that contains some form of built-in 3270 terminal emulator software and Java applets that know what to do with the 3270 data streams once they reach the desktop system. In the conversion method, 3270 formatted screens are converted into HTML format and posted to a Web server. The converted screens can then be viewed using any browser. These approaches are discussed in greater detail in an article entitled "How To Put Mainframes on the Web" by Salvatore Salamone published in the June 1996 issue of Byte Magazine.

A disadvantage of the conversion approach is that it may not offer acceptable performance, throughput and response time in a high volume transaction environment. The reason is that the message is translated in a Web server extension and possibly in an intermediate application. Additionally, the message is forced to be routed through several applications and through intermediate applications. To overcome these disadvantages, one system employs an applet that supports mapping screen images associated with a transaction processing application to a modem, intuitive Graphical User Interface (GUI). This eliminates the need for intermediate message translation by having the browser application applet generate and process messages that are understood by the mainframe application. The applet also translates replies received from the application screen image format into a format that can be presented to and understood by the user. This approach is described in the copending patent application entitled "Method for Reducing Message Translation and Traffic Through Intermediate Applications and Systems in an Internet Application", Ser. No. 08/868,178, filed on Jun. 3, 1997 and assigned to the same assignee as named herein.

While the above approach improves performance by eliminating the need for intermediate message translation, it is specifically designed to operate with IBM mainframe hosts. Further, since the approach utilizes applets, it requires that the applet and HTML page be downloaded from a server over a non-persistent connection. The applet when executed within the browser is required to open a persistent connection back to the server. Hence, this approach necessitates the establishment of both persistent and non-persistent connections. Further, this approach still is quite time consuming and only performant when the ratio of persistent (applet to server) to non-persistent (HTML page and applet loading) traffic is high. However, even in those cases, the approach still requires that time be expended in establishing additional connections.

As well known in the art, in the classical client/server model, connections between client and application servers remain open until the client logs off the system. By contrast, in the Web environment, there is no mechanism provided for keeping the client-to-server connection open. Each time a new page is requested, the user, Web server and additional processing must reidentified or reinitialized. The reason is that the Web browser is "stateless". This "statelessness" makes it difficult to create Web-based applications requiring multiform client-to-server interactions.

In Web-enabled client/server tools, state and session is usually stored in client-side "cookie" files or hidden fields in HyperText Markup Language (HTML) forms. In Java application server environments, state and session management information is typically stored and managed on the server. Some server products make use of a "context" pool. When transactions are begun, the Web server generates a unique process identifier that is maintained with state information on the server in a "context" pool. Additionally, the process ID (or context ID) is embedded in the HTML passed along to the client, along with other state information. While state information may change during the course of a session, the process ID remains constant until the session terminates and the ID is discarded or returned to the context pool for reuse. These approaches can be viewed as server based approaches.

Another server based approach provides for retaining mainframe connection information on a web server that locates a user's session when the browser reconnects and delivers the input to the mainframe application being run on the associated mainframe or legacy system. An example of this approach is the GWEB product developed by Gallagher & Robertson described at their website at http://www.gar.no/gweb/.

The combination of process IDs and storage of state information in a context pool is described in such server based approaches as allowing the execution environment of Java application servers to track the states of numerous clients connected to the Web server. In addition, it allows users to return to Web pages and view them in the state in which they left them. Further, it also ensures that a session is active during the user's entire interaction with the application and keeps track of the state of the client's interaction, as well as any transactions that are in progress, making it possible to commit and roll back operations. For a further discussion of Java application servers, reference may be made to the article entitled "Selecting Java App Servers" by Dan Kara published in the June 1998 issue of Object Magazine.

The above approaches place the burden on the server system to generate and manage the use of such state information. More importantly, since the use of such state information does not control the establishment of connections, it does not necessarily reduce the traffic on the particular internetwork over which client and server systems communicate.

To reduce traffic, another prior art system makes an on-line transaction processing system accessible to Web browsers by establishing a predetermined plurality of transaction gateway clients to receive HTTP requests that are received by a Web server from the Web browsers. Concurrent processing of multiple transaction requests from the Web browsers is performed by the plurality of transaction gateway clients. Each transaction gateway client pre-establishes a static connection with the on-line transaction processing system. The pre-established connection allows requests from the Web browsers to be quickly routed to the transaction processing system. The gateway client translates between HTTP formatted requests from the Web browsers and the request format expected by the on-line transaction processing system. This system is described in further detail, in U.S. Pat. No. 5,754,772 that issued on May 19, 1998.

While the system provides access to a mainframe host, the system has to be able to pre-allocate the required number of static connections and gateway clients beforehand making it more difficult for the system to respond to dynamic changes in operations. Further, the system must expend time in translating requests into the format expected by the on-line transaction processing system.

Another relevant prior art approach utilizes a server and a web browser terminal emulator for providing a persistent connection to a legacy host system. A computer network environment allows connection of a client system to a legacy host system using such a server system. The server system executes a client thread under a server. The client thread is operable to communicate with the legacy host system across a persistent TCP/IP socket connection. The computer network environment further includes a client system executing an applet process under a web server. The applet process is operable to communicate with the client thread across another persistent TCP/IP socket connection and is operable to provide a terminal session to a user of the client system. This approach is described in U.S. Pat. No. 5,754,830 issued on May 19, 1998. The main disadvantages of this approach pertain to requiring the loading of an applet and the inclusion of a web/emulation server.

Web browser software is well known in the art for use in retrieving and viewing electronic documents in HTML format from part of the "Internet" known as the "world-wide web". The World Wide Web part of the Internet is a collection of server computers (i.e., sites) on the Internet, which store HTML documents that can be publicly accessed by computer users connected to the Internet. HTML documents include as a subset, "forms" that allow the user to supply information. Thus, a server system (form provider) can use forms to collect information and to provide back and forth interaction. The use of forms is discussed in the text entitled, "CGI Programming on the World Wide Web," by Shishir Gundavaram, Copyright©1996, O'Reilly & Associates, Inc.

As known in the art, HTML documents on the World Wide Web often contain several thousands of bytes and often incorporate several image/graphic files representative of forms, each of which also contain thousands of bytes. At the current transfer speeds used to connect to the Internet, the transmission of such forms can take considerable time (e.g. seconds to minutes) to complete downloading from a computer site.

In some prior art enterprise systems, so-called "remote forms packages" have been used for terminal based applications to make form processing more time efficient. An example of two such packages are the Transaction Processor Forms Facility (TPFF) product and the Transaction Screen Management System 8 (TSM) product developed and marketed by Bull HN Information Systems Inc. Information about these software products may be found in the Bull publications entitled "Transaction Processing TPFF System Software Release Bulletin, Software Release 8FO1.0, Update 5 GCOS 8", order number 67 A2 SA65 Rev05, dated March, 1993 and "Tools & Utilities Transaction Screen Management System 8, TSM8 Reference Manual GCOS 8, order number 67 A2 ED42 Rev02, Dated March 1995.

These packages provide functionality that enables a remote forms mechanism (e.g. TSM8) to create a forms directory for a terminal user as required and also a subdirectory for every unique "connect name" (e.g., TSMTP8). This avoids needless retransmission of forms where form versions are not synchronized among multiple TSM8 installations. Using a co-operative TSM8 local forms storage protocol, the enterprise system connected to the terminal transmits the required forms for a particular user once. The forms received by the terminal are stored on a local storage device for later use. When a terminal user desires access to a form, this causes the generation of a form mount request to the local storage device that results in the display of the requested form on the user's terminal.

As known in the art, there are systems that provide for the remote retrieval and display management of electronic documents with incorporated images. These systems are able to provide both static and variable data associated with form documents. Examples of systems that provide for the remote retrieval and display management of electronic documents and for using a dialog session context to process electronic forms data are described in U.S. Pat. Nos. 5,778,372 and 5,784,562, respectively. It has been noted that typically, the static portion of such responses are high in data content and the repetitious transmission of this data content for multiple requests can be an inefficient use of bandwidth.

Thus, the above prior art approaches have not been able to achieve the same levels of network performance in processing HTML based forms as heretofore provided to users accustomed to using terminals with remote forms facilities. An important aspect of the present invention is its recognition of the need for a high performance solution that implements a remote forms capability heretofore provided by enterprise systems that can be utilized with standard browser software.

Web browser software utilizes a standard application communications protocol such as the HyperText Transport Protocol (HTTP) for processing HTML formatted documents. A number of vendor enterprise systems do not normally process HTML formatted documents and execute HTTP server programs. By contrast, such systems normally execute transactions using their own unique proprietary protocols (e.g. DSA, SNA) specifically designed for their particular applications in contrast to using a standard internet communications protocol such as TCP/IP. Recently, some vendors have implemented the RFC1006 specification that defines a protocol layer that closely resembles the OSI transport layer and runs on TCP/IP. By implementing such a layer, a proprietary protocol like DSA, developed by Bull HN Information Systems Inc., is allowed to run over a TCP/IP network.

While the above capability is available, there is still need to provide an efficient way of connecting to enterprise systems that operate with different communications protocols.

Accordingly, it is an object of the present invention to make communications sessions between a Web browser and a server persistent without having to utilize static connections.

It is a further object of the present invention to provide access to transaction applications running on a server system without having to reformat Web browser pages or alter use of existing protocols.

It is still a further object of the present invention to provide fast efficient transaction conversations for transferring various kinds of data messages.

Accordingly, it is another object of the present invention to provide a remote forms facility that operates in conjunction with standard browser software that is easy to manage by a browser user.

It is a further object of the present invention to provide a remote forms capability characterized by high performance and not having to reformat Web browser pages or alter use of existing protocols.

It is another object of the present invention to provide a facility for connecting to server systems that utilize different communications protocols.

SUMMARY OF THE INVENTION

The above objects are achieved in a preferred embodiment of the present invention for processing requests generated by a user of a client system for accessing facilities of a server system through a communications network. The client system includes a high performance gateway component that operates in conjunction with a standard browser component. In the preferred embodiment, the gateway component is installed on the same client system or on a client workstation system. The gateway Component manages the establishment of persistent sessions in response to client requests and maintains information uniquely identifying existing persistent session connections opened between the client system and the server system.

In accordance with the present invention, the client side capabilities are enhanced through the inclusion of such a gateway component. The gateway component operatively couples to the standard browser component through a standard browser interface. More specifically, the browser component and gateway component communicate using standard HTTP protocols over a standard browser interface. The gateway component operatively couples to the server system through an internetwork (e.g. Internet). In the preferred embodiment, the gateway component communicates with the server system through several layers of protocols to obviate the need to develop additional protocol software for running existing server applications. The protocols used in the preferred embodiment are HTTP, DSA and TCP/IP.

According to the teachings of the present invention, the browser component initiates the utilization of new session connections and reuse of existing session connections through an uniquely coded universal resource locator (URL) contained in each issued request. Each URL is passed to the gateway component that examines a context field included within the URL. If the context field has been set to a first value, the gateway component opens a new session connection to the server system and records the session information as an entry in a persistent session table (PST) component maintained by the gateway component. If the context field has been set to a value other than the first value, then the gateway component obtains the session information in the PST component for the established session and passes the data from the browser component to the server system over the existing session connection.

In the preferred embodiment, the server system's response to an initial request from the gateway component following the establishment of the new persistent connection generates a HTML page with a BASE tag value and also communicates the base value to the gateway component which stores it as part of the PST entry. Relative links in the new HTML page, when activated, are built by the browser incorporating the new BASE value which results in a URL containing the new base value being used on any subsequent requests which uses these links. The BASE value in the URL enables the gateway component to locate the connection, which enables the use of an established persistent connection throughout a session.

The arrangement of the present invention improves system performance by providing "client side" dynamically controlled persistent connections. This eliminates the need to continuously establish new sessions each time the "stateless" browser component initiates a request. Further, the invention accomplishes this by extending the functionality of the client system by the addition of the gateway component thereby relieving the server system from the burden of having to establish and control persistent connections. Further, the arrangement of the present invention enables the use of persistent connections for transferring data messages other than forms in that the connection information is preserved by the gateway component until the client system has terminated a particular session. Of course, it will be appreciated that when a particular session connection is being utilized by more than one client browser user as described herein, the gateway component retains the connection information until all browser users have completed their respective sessions.

In accordance with the teachings of the present invention, the gateway component of the preferred embodiment may also include the capability of enabling use of "session pools". When the gateway component includes this capability, a plurality of persistent sessions connections are initially established. This allows the gateway component to immediately connect a browser component to a server system in response to a browser request having a URL specifying a new session connection. The result is improved performance.

Also in accordance with the teachings of the present invention, the gateway component may also include the capability of enabling multiplexing persistent session connections for servicing a plurality of browser requests generated during a number of different user sessions. This capability enables several browser users or a single browser user to conduct multiple sessions over a single shared persistent session connection. An advantage of such a capability is an improvement in processing efficiency in handling a high volume of user requests with a limited number of connections.

In accordance with the teachings of the present invention, the above capabilities are invoked by the browser component by the same basic URL mechanism. The URL of the preferred embodiment may include an optional field portion that enables a user to select either capability or elect not to use a capability in a given situation. For example, a user may elect not to enable the multiplexing capability because of not wanting to share a common persistent connection for reasons of maintaining security.

In addition to the above, the gateway component of the present invention includes facilities that enable a browser user to communicate with a particular enterprise server system using any one of a number of predefined communications protocols (e.g. DSA, SNA) based on the requirements of the particular system. In accordance with the teachings of the present invention, the basic URL mechanism is used to enable user selection of a particular communications protocol.

Also in accordance with the teachings of the present invention, the gateway component of the preferred embodiment of the present invention includes a remote forms mechanism that enables storage of the static portion of a message that is local to a Web browser client system so that only variable data needs to be transmitted from a server to the browser client system. As used herein, the term "remote form" refers to the static portion of an HTML page. The mechanism provides local storage in the form of a cache component for retaining the static portions of a plurality of forms in close proximity to the client user. If the remote form is present in the cache component, the gateway component reads the form and merges it with the data returned from the server in its response. The gateway component then forwards the merged data to the browser for display to the user.

If the remote form is not present in the local cache, the gateway component will make a request to the server for a copy of the form. When the form is received from the server, the gateway component will write it to its cache. The gateway component will then merge the form with the data previously received and forward it to the browser for display to the user.

The gateway component of the present invention requires no changes to the standard browser system. For example, the gateway component in the preferred embodiment is implemented as a plurality of class objects that can run on the virtual machine included as part of the standard browser and utilize standard Java library routines for establishing and maintaining persistent connections. Hence, the present invention is able to maximize the use of capabilities included with a standard browser.

Further, the present invention enhances performance by coding all of the pertinent connection information and any available options into the URL. This avoids unnecessary scanning operations for detecting "cookies" in HTTP headers and hidden form fields in HTML document pages. In addition, since the URL does not point to an actual file system directory, it is possible to have a unique URL for every persistent connection. Thus, the gateway component is able to maintain persistent connections while at the same time conforming to the requirements of the HTTP stateless protocol.

It will be noted that the term "gateway" has been used in referring to the access mechanism of the present invention. In accordance with the teachings of the present invention, the term "gateway" is used in the broad sense to refer to a software component that is installable on a standard personal computer or workstation rather than on a separate or immediate server system, such as a Web or HTTP server system.

DESCRIPTION OF THE DRAWINGS

FIG. 2 illustrates in greater detail, the client browser system of the present invention.

DESCRIPTION OF THE PREFERRED EMBODIMENT

Figure 1:
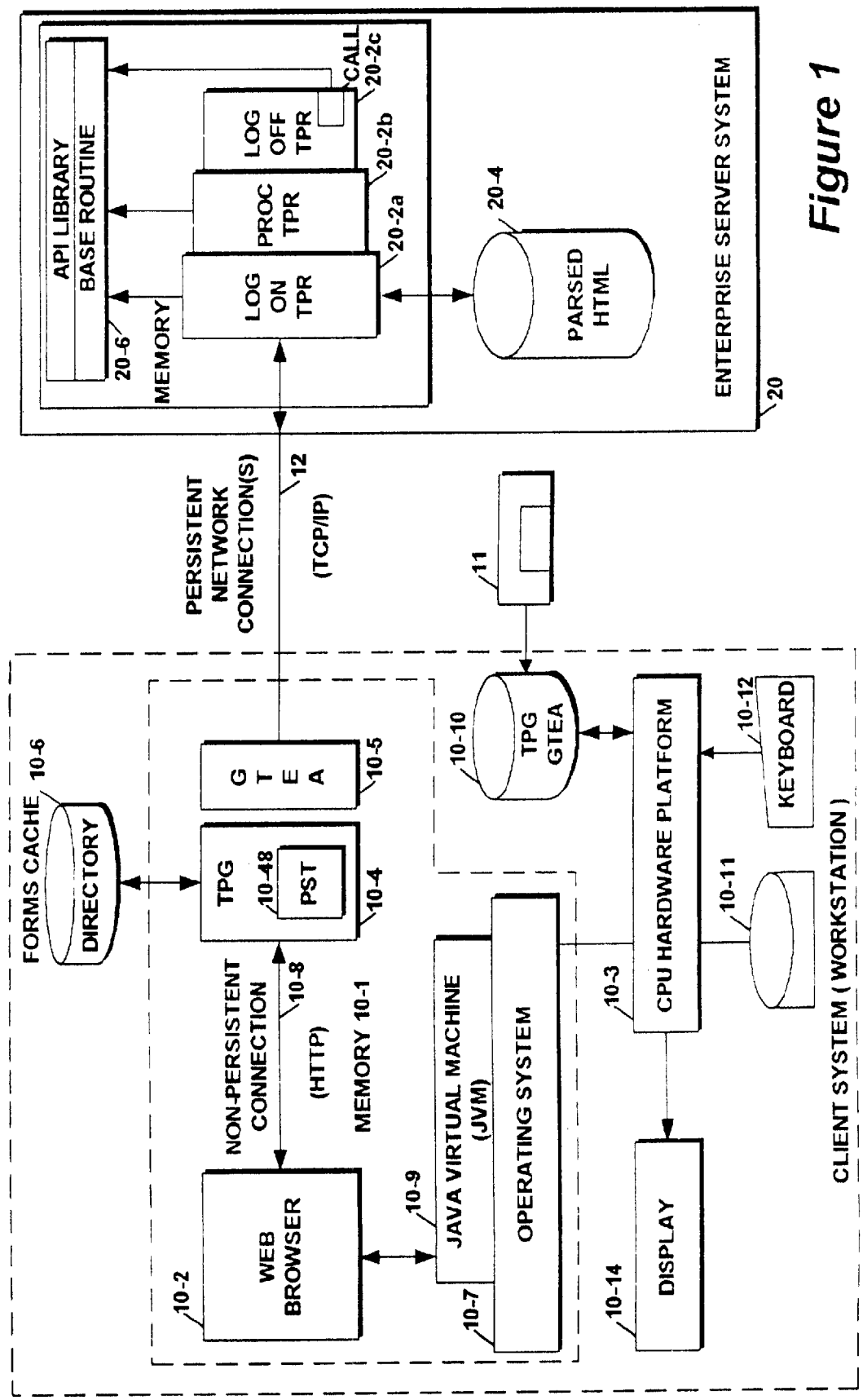
FIG. 1 is an overall block diagram of a transaction processing system that utilizes the method and client browser access component of the present invention.

FIG. 1 illustrates a client server system 10 that includes the method and the transaction protocol gateway (TPG) component of the present invention. As shown, the system 10 includes an enterprise server system 20 and a client system 10 that couple to each other through a communications network 14 utilizing the TCP/IP protocol.

Server System

The enterprise server system 20 is capable of running transaction processing application software 20-2 and database storage 20-4. The server system 20 can be typically a mainframe transaction processing system, conventional in design, that supports a number of workstation users. For example, the server enterprise system 20 may take the form of the Bull GCOS8 system manufactured by Bull HN Information Systems Inc. that runs transaction processing software designated as TP8. The transaction processing application software stored in enterprise system's memory includes a plurality of transaction program routines (TPRs) designated as 20-2a through 20-2c. Such routines provide for accessing HTML documents stored on database storage 20-4 and for communicating with the client system 10 using the HTTP protocol. These routines operatively couple to an API library component 20-6. Component 20-6 stores a plurality of runtime routines that enables a TPR transaction program to respond to HTTP requests from browser client system 10. A particular API routine pertinent to the present invention is an HTML__BASE routine that is called by a TPR application program for generating a BASE value as described herein.

The database storage 20-4 acts as a repository for HTML form based documents. In the preferred version of such software, the HTML documents before being stored are passed through a parser that parses each document into static and dynamic portions. This enables transmission of static HTML records without requiring the server to interpret such records. This arrangement is described in greater detail in the copending application entitled, "Method and Apparatus For Improving Code Execution Performance By Using Parsed HTML," invented by Michael Giroux, filed on May 13, 1998, bearing Ser. No. 09/078,084 and which is assigned to the same assignee as named herein.

Client System

As illustrated in FIG. 1, client system 10 includes a web browser component 10-2, a transaction protocol gateway (TPG) component 10-4, a protocol conversion layer component 10-5 (GTEA) and a forms cache component 10-6. More specifically, with reference to FIG. 1, the client system 10 includes a central processing unit that corresponds to CPU hardware platform 10-3, a main memory 10-1, disk storage 10-10, a plurality of input devices such as a keyboard 10-12 and a pointing device or mouse 10-11 and an output device such as CRT display 10-14, each of which interfaces as indicated. The hardware platform 10-3 runs under the control of an operating system 10-7 such as Windows NT or a UNIX based operating system. The client system 10 also may utilize other software and hardware that includes standard internetwork web browser software. In the preferred embodiment, the web browser component 10-2 includes commercially available application browser software such as Netscape Navigator or Microsoft Explorer that may be Java enabled. That is, browser applets execute under control of a Java virtual machine (JVM) component 10-9. Similarly, the TPG component 10-4 and GTEA component 10-5 also execute under JVM component 10-9. It will also be appreciated that client system 10 also includes appropriate interface network (not shown) that allow the system to send and receive data from any network to which system 10 may connect. For example, the network may be a local area network (LAN) or, more specifically, the Internet. In this regard, it should be noted that in contrast to the prior art applets are not required for establishing persistent connections according to the teachings of the present invention.

As indicated, the web browser component 10-2 operatively couples to the TPG component 10-4 and communicates with such component through a "non-persistent" connection established by utilizing a standard HTTP protocol (e.g. HTTP 1.0, HTTP 1.1). The TPG component 10-4 includes routines/methods for performing a listener function and a connection function. The listener function involves listening on a configurable port for browser "connections" communicated via HTTP protocol requests (e.g. GET). The connection function involves establishing the required persistent session connections as discussed herein.

As shown in FIG. 1, the TPG component 10-4 further includes a persistent session table (PST) structure component 10-48 that is used by the connection function for storing session connection information for establishing and maintaining persistent connections between client system 10 and server system 20 in addition to reusing existing session connections. Additionally, the PST component 10-48 is used by routines/methods that manage the sessions taking place such as performing standard "socket" session functions (e.g. open( ), read/write( ), close( )) using standard Java network library routines executing under JVM component 10-9. In the preferred embodiment, PST component 10-48 corresponds to a hash table structure whose entry locations are accessed via a token value. The use of such structures for identifying or tracking objects or entities by a token (e.g. name) as the identifying key is well known in the art. The use of PST component 10-48 is discussed in greater detail herein.

In greater detail, the GTEA component 10-5 is a "service" which converts DSA calls (i.e., native Bull HN Information Systems GCOS communications protocol) to TCP/IP calls using the so-called RPC1006 protocol. This allows DSA to run over the TCP/IP protocol. In the preferred embodiment, the GTEA component 10-5 establishes a simple API that enables users to write client applications using open TCP/IP standards while at the same time utilizing the advantages of the DSA protocol. The advantages of using such a protocol component are discussed in a presentation entitled, "G&R Host Links BUS 1996", available at the Gallagher & Robertson web site located at http://www.gar.no/presentations/h196us/. Examples of the GTEA component are provided in the Appendix portion of this specification. In a similar manner, GTEA component 10-5 also enables the SNA protocol layer to run over TCP/IP. As well known, SNA (systems network architecture) is a widely used communications protocol framework developed by IBM Corporation that enables different models of IBM computers to exchange and process data over a communications network. It will be appreciated that when the SOCK protocol is to be used, the GTEA component 10-5 is bypassed. The selection and use of different communications protocols in conjunction with TPG component 10-4 is described in greater detail herein.

While the preferred embodiment of the present invention is being described relative to a client workstation system, those skilled in the art will appreciate that the present invention is capable of being distributed as a program product in a variety of forms and that the present invention applies equally or operates independently of the type of media used to carry out the distribution. For example, as indicated in FIG. 1, the components of the present invention may be contained on magnetic recordable type media such as a floppy disk 11 of FIG. 1. In this case, the program product components (i.e., TPG component 10-4 and GTEA component 10-5) contained on the disk 11 would be installed on client system 10. More specifically, the contents of disk 11 would be read under the control of hardware platform 10-3 and then loaded onto mass storage 10-10 (e.g. hard disk). As indicated on FIG. 1, these program product components would also be loaded into memory 10-1 for operating in conjunction with the other software components of the client system 10. FIG. 2

FIG. 2 illustrates in greater detail, the different functional components of TPG component 10-4. As shown, the component 10-4 includes a browser request processing component 10-4 that operatively couples to the PST component 10-48 and to a connection request queue 10-49. Additionally, component 10-4 includes response processing component 10-42 and server forms request processing component 10-46. In the preferred embodiment, the different components of TPG component 10-4 are implemented using Java classes that provide a set of cooperating objects. The architecture defined by such classes and objects is described in greater detail in the Appendix.

The request processing component 10-40 processes browser connection requests and establishes the required persistent session connections either by establishing new session connections or using existing session connections. Thus, component 10-40 performs the listener and connection functions discussed above. The logic of component 10-40 in processing input connection requests is illustrated in greater detail in FIG. 3a. The operations performed by component 10-40 will be discussed in greater detail relative to that figure.

The response processing component 10-42 responds to responses received from server system 20 during sessions initiated by browser component 10-2. Accordingly, it communicates with request processing component 10-40 as required for updating the status of existing persistent connections (e.g. close( )). Additionally, since component 10-42 provides responses to the browser component 10-2, the component also is involved in processing remote forms along with component 10-46. The logic of component 10-42 in processing server requests is illustrated in greater detail in FIG. 3b. The operations performed by component 10-42 will be discussed relative to that figure.

The server forms request processing component 10-46 responds to remote forms requests received from server system 20 via an appropriate remote forms protocol. The component 10-46 passes the results of such form processing to component 10-42 for forwarding to browser component 10-2. The logic of component 10-46 in processing remote form requests is illustrated in greater detail in FIG. 3c. The operations of component 10-46 will be discussed in greater detail relative to that figure.

DETAILED DESCRIPTION OF TPG COMPONENTS

Figure 3A:
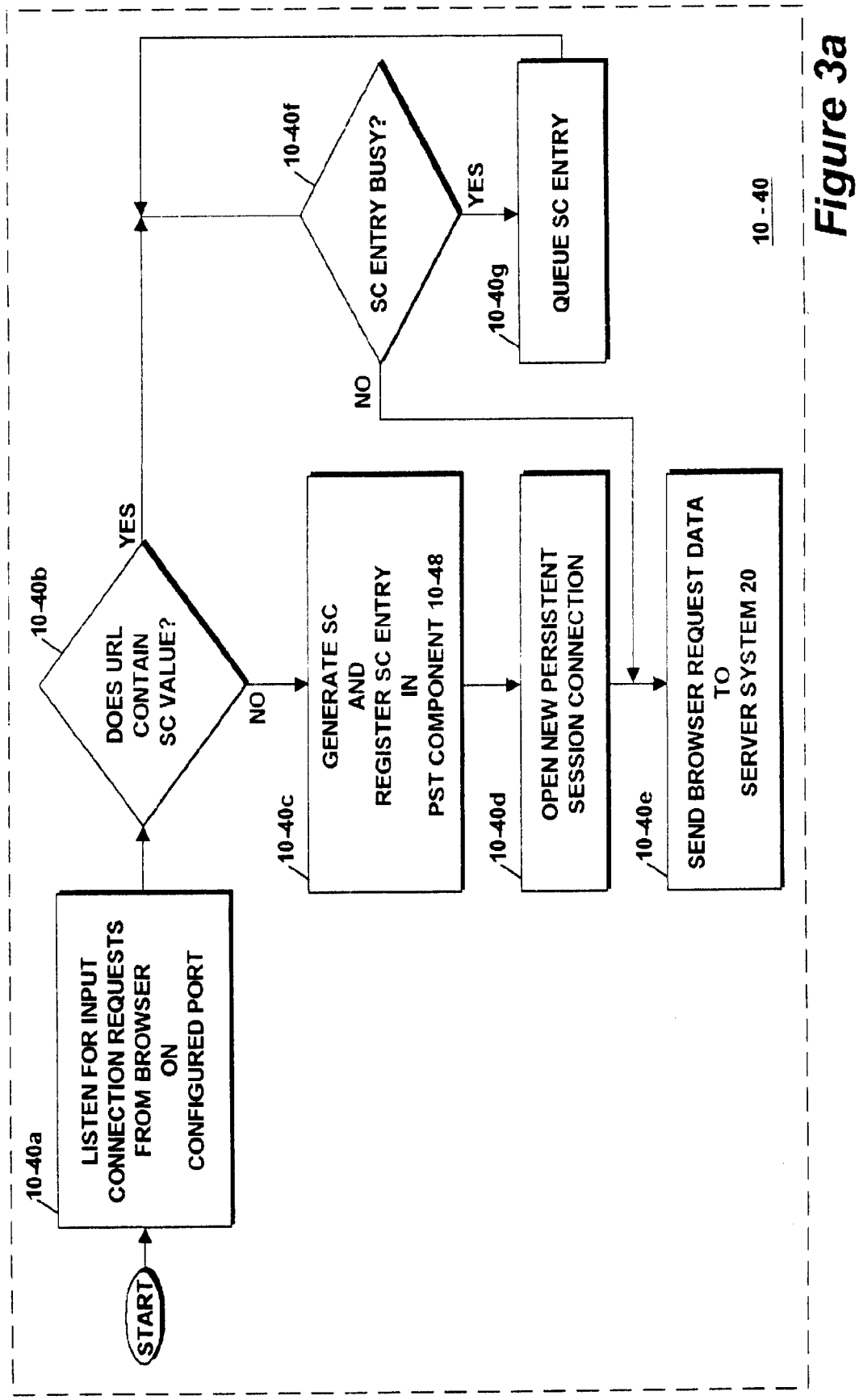
FIGS. 3a through 3c illustrate in greater detail, the components of the client browser system of FIG. 2.

FIG. 3a—Gateway Request Processing Logic

FIG. 3a illustrates the logic of component 10-40. As shown, component 10-40 using its listening function, listens for input connection requests from browser component 10-2 on the configured port (i.e., block 10-40a). For each browser request accepted, component 10-40 examines the request's URL to determine if it contains a session context (SC) value (i.e., block 10-40b). Next, as indicated in block 10-40c, the component 10-40 determines if the SC value equals zero. If the SC value equals zero, this indicates that a session has not been established between the browser component 10-2 and the server system 20 (i.e., "no" path). As indicated in block 10-40c, component 10-40 invokes its connection function to establish a persistent session connection via "sockets". More specifically, component 10-40 first generates a session context (SC) value and "registers" it in one of the locations of PST component 10-48 (i.e., block 10-40c). That is, as indicated in block 10-40d the component 10-40 records session information in the assigned PST location and opens a new session connection via a call to protocol conversion layer component 10-5 which uses "sockets" (i.e., issues a socket "open" call).

The establishing of the session connection involves calling standard socket subroutines and network library subroutines provided by the client system operating system. Once a "session connection" has been established between the server system 20 and client system 10, component 10-40 sends the browser data to server system 20 over the newly established persistent connection (i.e., block 10-40e).

As indicated, if the session context value contained in the URL is not equal to zero, indicating that a persistent session connection has already been established, component 10-40 checks to see if the session connection is busy (i.e., block 10-40f). It will be noted that TPG component 10-4 allows (serializes) multiple requests from the same browser component over the same session connection. If the session connection specified by the browser request is busy, then component 10-40 queues the entry until the session connection is available (i.e., blocks 10-40f and 10-40g).

Figure 3B:
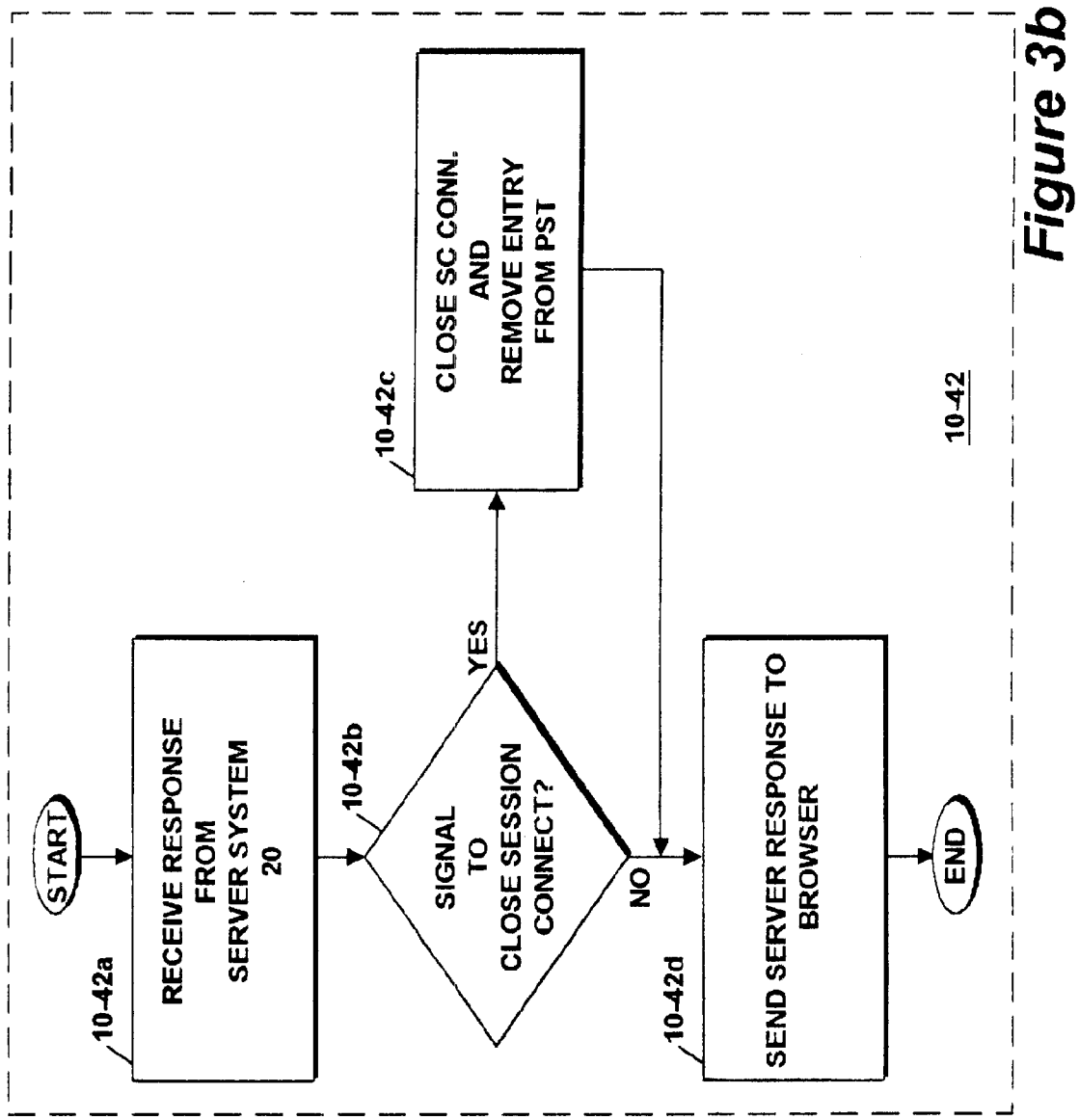

FIG. 3b—Gateway Response Processing Logic

FIG. 3b illustrates the logic of component 10-42. As indicated in block 10-42a, component 10-42 receives responses (messages) from server system 20. If the component 10-42 receives a signal to close the persistent connection from the server system 20 (i.e., block 10-42b), then component 10-42 operates to close the "socket" connection and delete the SC connection entry from PST component 10-48 identified by the SC value. After carrying out those operations, component 10-2 forwards the server response to the browser component 10-2 (i.e., block 10-42d).

Figure 3C:
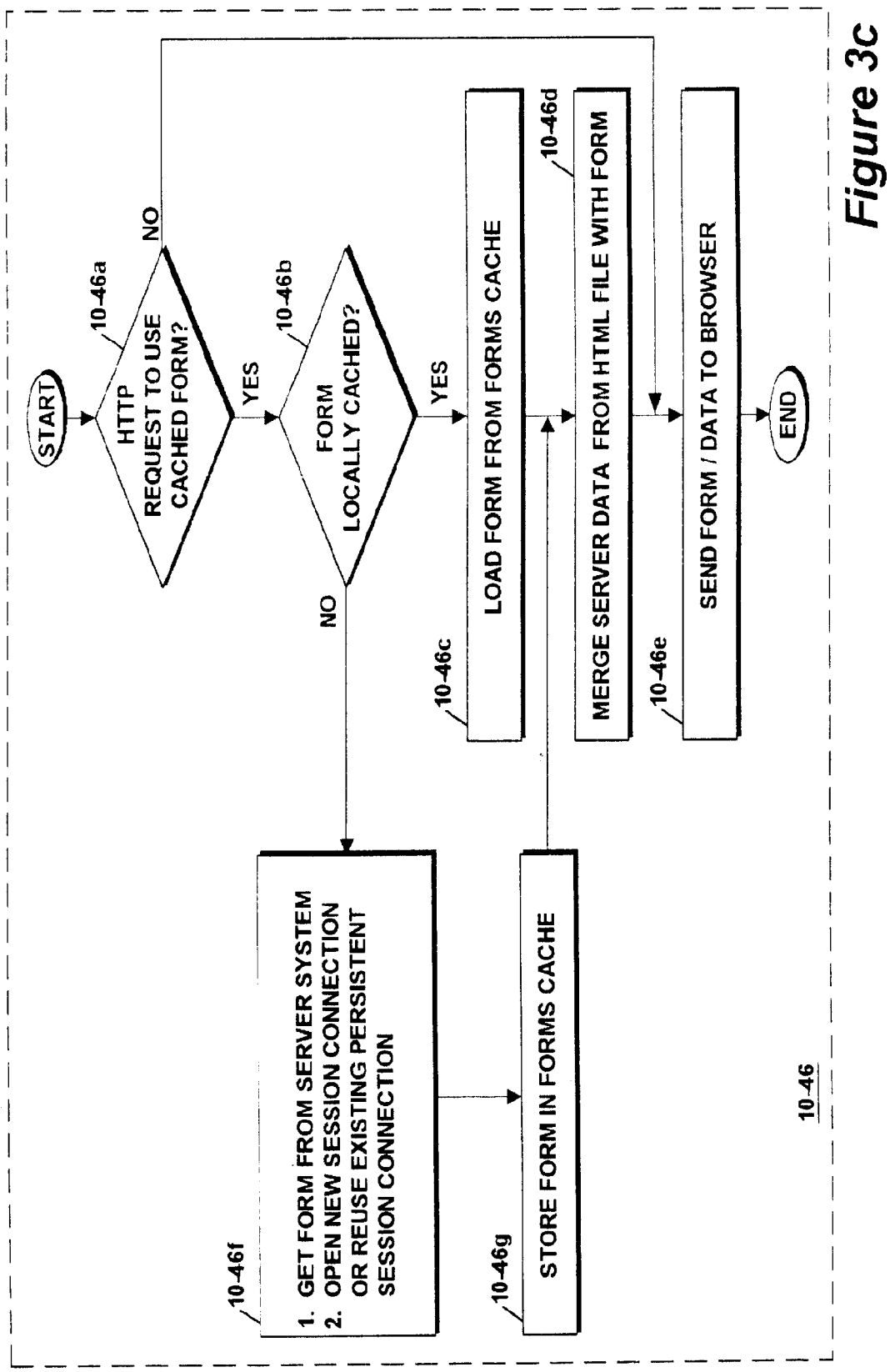

FIG. 3c—Remote Forms Logic

FIG. 3c illustrates the logic of component 10-46 in processing a request for a remote form from server system 20. As discussed above, the remote form corresponds to the static portion of an HTML page. The TPG component 10-4 provides local storage in forms cache 10-6. This provides additional performance enhancement particularly when used along with the TPG component's capability to maintain persistent connections.

As indicated in block 10-46a of FIG. 3c, component 10-46 first determines if the HTTP request is to use a cached form. If it is, component 10-46 next determines if the form is cached in forms cache 10-6 (i.e., block 10-46b). This is accomplished by performing a search of the forms cache 10-6 directory. If the form is located, component 10-42 loads or reads out the form from cache 10-6 into a buffer area of memory (i.e., block 10-46c). Next, component 10-46 merges the server data accompanying the server's request obtained from its HTML data storage 20-4 with the static portion of the HTML page (i.e., block 10-46d). The HTML page containing both the form and server data is then sent by component 10-46 to browser component 10-2 for display (i.e., block 10-46e).

In the case where component 10-46 determines that the form is not cached (i.e., block 10-46b), component 10-46 will make a request for a copy of the form from server system 20. The request is transferred by either opening a new session connection or by using an existing session connection (i.e., block 10-46f). This operation is carried out by invoking component 10-40. As further described herein, component 10-40 sends a request for the specified form using the remote forms protocol illustrated in FIG. 5 (see Appendix for a discussion of this Figure). The determination to open a new session connection or use an existing session connection is made by component 10-40 in the manner described above. As indicated by block 10-46g, upon receipt of a response containing the form (i.e., the static portion of the HTML page), component 10-46 writes the form into the forms cache 10-6 as well as updating its directory to reflect such storage. Next, component 10-46 merges the form with the data previously received from the server system in its HTTP request and forwards the entire HTML page to browser component 10-2 for display (i.e., block 10-46e).

Description of URL Encoding

The preferred embodiment of the present invention makes use of the standard Uniform Resource Locator (URL) in establishing persistent session connections. By encoding all required connection information into the URL as described herein in greater detail, the present invention avoids unnecessary scanning of HTTP headers for "Cookies" and hidden form fields as in prior art approaches utilized for maintaining state information. This approach provides optimum performance when used in a high volume enterprise computing environment. Moreover, it allows use of standard browser software and standard HTTP protocols as discussed herein.

By way of background, the URL is a standard way to specify the location of a resource (e.g. document) anywhere on the World Wide Web. The exact specification of the URL is defined by the specification RFC 1738 that can be located at http://www.w3.org/hypertext/WWW/Addressing/Addressing.html. A URL is composed of three pieces of information:

1. Protocol name—typically HTTP
2. Server address
3. Resource name (e.g a file on a Web server).

The forms of URLs include absolute and relative. An absolute URL specifies all of the addressing information—protocol, server address, and a resource name that is necessary to locate the desired resource. By contrast, a relative URL (e.g. document) contains only a relative file name. The pathname supplied is relative to the path or directory of the referencing document. Thus, relative URLs allow collections of documents to be moved from one directory to another without affecting the links contained in the documents.

As well known in the art, browsers combine relative URLs with a document "base" value to form an absolute URL. Every time a browser makes a request for a document, it "remembers" the base name of the document for use in forming absolute URLs for any "HREF" field that specifies a relative name. The HREF field is contained within an HTML anchor element <A> included within the document for specifying a hyperlink (i.e., resource requested when the link is selected by a user). For more information regarding the use of such fields, reference may be made to the Bull HN Information Systems Inc. publication entitled, "Distributed Computing Web 8 User's Guide GCOS 8, order number 67 A2 RJ10 Rev01, Version 3.0, dated July 1998.

When browser component 10-2 connects to server system 20 using the transaction gateway component 10-4, a persistent connection is established for conducting a DSA session. This enables the browser component 10-2 to reuse the DSA persistent connection for every subsequent message.

To accomplish this, the gateway component 10-4 retrieves information from the URL of each new message and selects a specific DSA connection based on the part of the URL that contains a session context identifier.

As discussed above, a URL is composed of a protocol name, server address, and resource name. In the preferred embodiment, the resource name specifies information that is used by the gateway to execute a specific transaction. The general format of a Web URL used by the present invention is as follows:

http://gateway/node.mailbox.protocol/session context identifier/tp8_command/options where:

| | |
|---|---|
| http: | is the protocol |
| gateway | is the server address, including the configured port number |
| <rest of URL> | is the resource name |

The protocol and server address portions of a URL are the same as for a conventional URL that targets any Web server. The format of the rest of the URL is unique to the present invention, as explained herein.

The resource-name portion of the URL consists of four distinct fields.

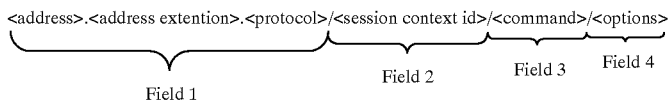

The first field (field 1) specifies the address of the application server. The "protocol" portion specifies the session protocol to be used when establishing a session between the client and the server. Examples of possible protocols and their keywords are:

SNA Proprietary IBM protocol.

DSA Proprietary Bull Information Systems protocol based on OSI. This is the default protocol in the preferred implementation. The default protocol can be set using an administrative page provided through a further port connection associated with the gateway component 10-4.

SOCK Standard UNIX sockets protocol.

The remainder of this description assumes a URL where the DSA protocol has been selected in which case the URL looks like this:

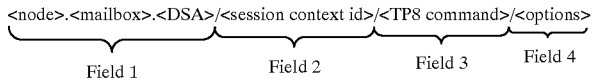

Assuming a DSA protocol, the first two elements of field 1 specifies a DSA node name and host mailbox for the desired enterprise server workstation. These values are used by the gateway component 10-4 to establish a connection to the target enterprise server workstation.

The second field is a context field (field 2) specifies a persistent session connection identifier value, which is guaranteed to be unique. The persistent session context identifier is assigned by the gateway component 10-4 when the browser submits a request that contains a zero in this field. That is, when the session context field is "/0/", the gateway creates a new DSA connection to the transaction processing (TP) enterprise server workstation that is identified by <node>.<mailbox>. When the connection is established, a unique connection identifier is assigned by the gateway component 10-4 for conducting the session, and all additional requests from the browser specify the persistent session context identifier in place of the original "/0/".

The third field (field 3) of the resource name specifies a TP command to be executed.

The fourth field (field 4) is optional and is passed on to the server without modification by the gateway component 10-4. This field is used to specify options to be used by the TPR transaction program. The TPR transaction program uses a "HTTP_GETPATH" API routine to obtain the value of the options field. Reference may be made to the Appendix in the above-cited Bull Web8 User Manual for descriptions of this API. Note that the TP command name does not appear at the beginning of the input message. To enable the use of default TP command processing, the gateway component 10-4 reorganizes or repackages (i.e., encapsulates) the URL so that it appears to TP to be a native TP command. This obviates the need to change the TP executive software. The gateway component 10-4 copies the TP command name to the beginning of the input message. For example, consider the following URL.

http://gateway/sys1.tp8ws/0/logon/12345

When processing this URL, the browser component 10-2 makes a connection to the gateway component 10-4 at IP address "gateway" and uses the "http" protocol to submit a "GET" request. The HTTP request message sent by the browser component 10-2 to the gateway component 10-4 is:

GET /sys1.tp8ws/0/logon/12345 HTTP/1.0

The gateway component 10-4 examines this message and copies the TP command name to the beginning of the message. The message submitted to the TP server workstation is:

logon context=<cid>.<tod><CRLF>
<CRLF>
GET /sys1.tp8ws/0/logon/12345 HTTP/1.0

In this example, the gateway component 10-4 copied the "logon" command name to the beginning of the message. In addition, the gateway component 10-4 detected a session identifier of "/0/" and established a new persistent connection for conducting a browser session. Because the gateway component 10-4 created a new persistent connection, the new connection identifier is also passed to the TPR transaction program as part of the message prefix.

The information added by the gateway component 10-4 must conform to the HTTP protocol specification to avoid any ambiguity during the processing of each input message. Consequently the line added by the gateway is terminated by a CRLF sequence. The CRLF (carriage return/line feed) is the standard HTTP protocol line terminator. This sequence is also referred to as a new line and typically appears in the document as <NL>. A line that consists of only the CRLF sequence is added to mark the end of the information in the gateway header. The original HTTP request submitted by the browser component 10-4 follows the "gateway" header. The description of the runtime library (i.e., API library 20-6) refers to this gateway header as an "environment." The HTTP_GETENV family of routines (which are described in the Appendix of the previously referenced Bull User Manual) are used to process the gateway header.

For the browser component 10-2 to submit requests using the newly created DSA session connection, the browser component 10-2 must determine that the base URL contains the newly assigned session context identifier. Continuing with the previous example, it is assumed that the gateway component 10-4 created a new connection and assigned a session context identifier of "1234.abcd". The message sent by the browser component 10-2 to the server system 20 then is:

logon context=1234.abcd<CRLF>
    <CRLF>
    GET /sys1.tp8ws/0/logon/12345 HTTP/1.0

Usually, if the page returned by the LOGON command contains a relative URL, the browser component 10-2 forms a new absolute URL using the current document base, which in this example is:

http://gateway/sys1.tp8ws/0/.

However, using this document base results in yet another DSA session connection being created, and the new message is sent to the new session connection. To send messages to the DSA session connection that was created for the LOGON request, the browser component 10-2 must establish that the document base is actually:

http://gateway/sys1.tp8ws/1234.abcd/.

The HTML specification provides a convenient mechanism for this purpose; the <BASE> tag. The HTML <BASE> tag provides a standard method for an application to explicitly specify the base for the document that contains the <BASE> tag. Using the <BASE> tag, the TP transaction application program can use the HREF attribute to specify any arbitrary document base. In our example, the application would generate the following sequence of HTML in response to the original LOGON request:

<HTML>
      <HEAD>
        <BASE HREF="http://gateway/sys1.tp8ws/1234.abcd/">
      </HEAD>.

When the browser component 10-2 receives a document that contains the <BASE> HTML element, the browser component 10-2 uses the information provided in the HREF attribute to resolve any relative references that are contained within the HTML document.

Because most TP Web applications need to generate <BASE> tags, the API library 20-6 of the enterprise server software includes the HTML_BASE routine illustrated in the Appendix, which can be used to generate the complete <BASE> element. The routine returns the result to the TPR transaction program, which can then include the generated <BASE> in Web pages.

The gateway component 10-4 requires the TPR transaction program to define an additional application-specific suffix for the session context identifier. The session context identifier generated by the gateway component 10-4 contains two values and the complete session context identifier includes a third value that contains an application-specific value.

A TPR transaction application program must specify an application-context value whenever the <BASE> is generated. This context value must be non-zero, and has a maximum size of 32 bits.

In addition, an application can specify a new application-specific value at any time to provide additional control over the application. Changing this portion of the session context identifier prevents the user from submitting requests from bookmarks, thus providing an additional form of protection against misuse.

Whenever a TPR transaction program assigns a new application-context value, the new base information must be provided to the browser component 10-2 via the <BASE> element. In addition, the gateway component 10-4 must be notified of the new application context. Communication between the TPR transaction program and the gateway component 10-4 takes place on the HTTP status-response line using the message portion of the status record. If the TPR transaction program wants to set the application-context value to "5678", then the complete session context identifier in the example is:

1234.abcd.5678.

The TPR transaction program is responsible for generating the complete HTTP response header and the HTML document. The HTTP response begins with an HTTP status, which includes a numeric completion-status code and a text message. In non-Web environments, the text portion typically is ignored and is provided only as a convenience for debugging the HTTP protocol. In the preferred embodiment, this field is used to communicate from the TPR transaction program to the gateway component 10-4.

The message sent to the browser component 10-2 includes an HTTP response header that identifies the new application-context value, and an HTML <BASE> element that identifies the complete session context identifier.

HTTP/1.0 200 CONTEXT=5678<NL>
    Content-type: text/html<NL>
    <NL>
    <HTML>
    <HEAD>
    <BASE HRBF="http://gateway/sys1.tp8ws/1234.abcd.5678/">
    </HEAD>
    <BODY>
    Rest of HTML response goes here
    </BODY>
    </HTML>

The above example shows an HTTP response header that conforms to the HTTP version 1.0 specification. The completion code of "200" (i.e. described in the HTTP1.0 and HTTP1.1 specifications) indicates that the request was processed successfully. The text that follows the completion code contains the reserved word "CONTEXT=" and the new application-context value of "5678,". The gateway component 10-4 copies this value to the PST entry allocated to the current DSA session connection.

Any subsequent input message that specifies the gateway context identifier is validated by the gateway component 10-4 to include the correct time-of-day and application-context value. Failure to match on either field results in an HTTP response indicating that the requested resource was not found.

In addition, the <BASE> header element contains the complete session context identifier, including the application-context value. The browser component 10-2 uses this new base information when constructing absolute URLs for the links that are included in the current document.

Description of Operation

Figure 4A:
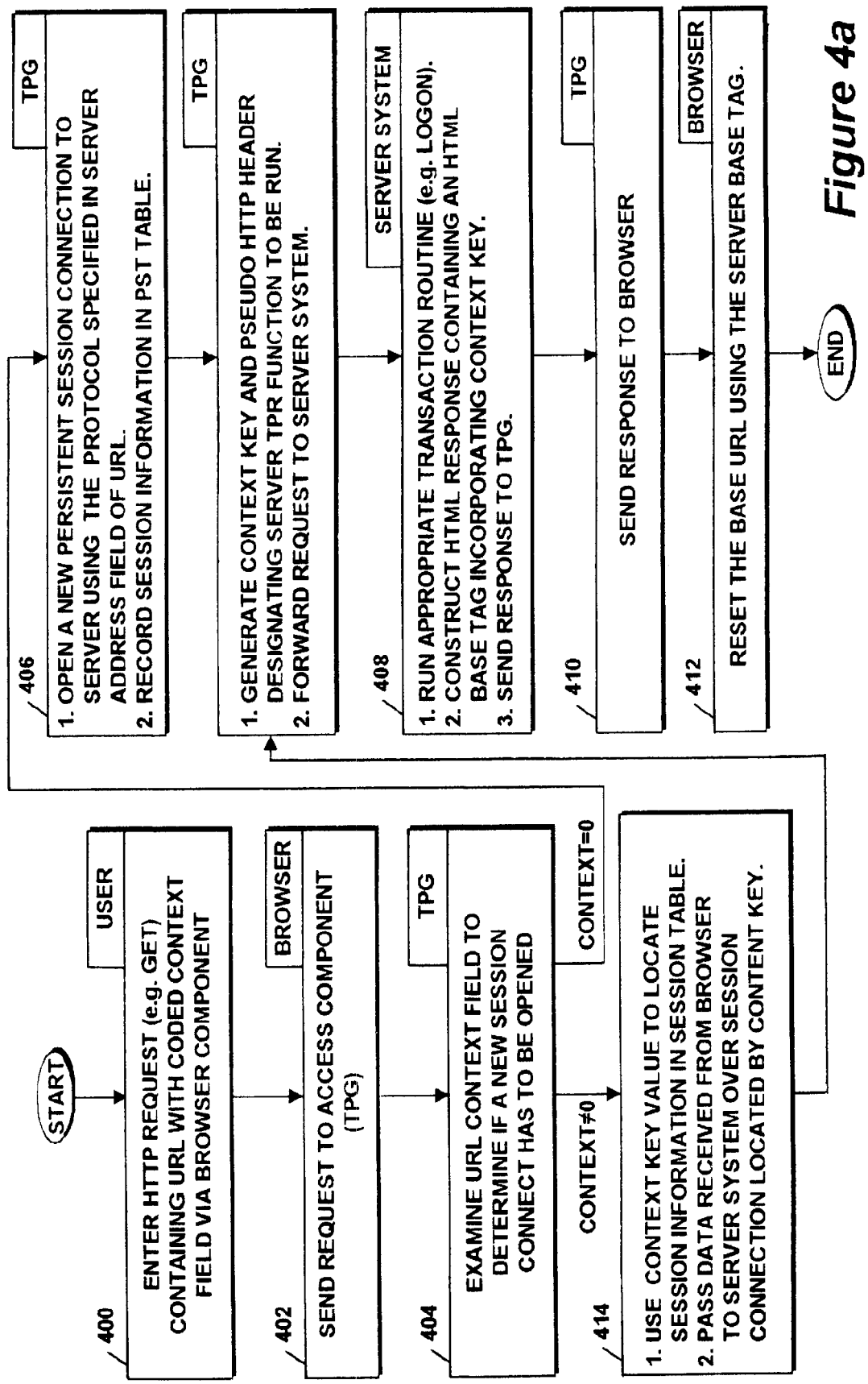
FIGS. 4a and 4b are flow diagrams used to describe different capabilities of the preferred embodiment of the present invention in managing persistent session connections.

The overall operation of the preferred embodiment of the present invention will now be described with respect to FIGS. 1 through 5. The flow chart of FIG. 4a illustrates the overall operation in establishing and using persistent connections according to the teachings of the present invention. These operations are diagrammatically depicted in FIG. 4b. Referring to FIG. 4a, it is seen that it is assumed that the user at the client system 10 enters an HTTP request containing a URL with a context field via the browser component 10-2 (item 1 in FIG. 4b). More specifically, the user enters a URL containing the usual fields plus a context key field containing a value of zero (e.g. via keyboard 10-12 of FIG. 1. By way of example, the user enters the following URL: HTTP://sandpiper: 8080/ph45.web8.dsa/0/logon where: sandpiper:8080 address of the TPG component 10-4;
ph45.web8.protocol address of the server system 20
 (protocol is the protocol to be used between the TPG component 10-4 and the server system 20 (e.g. DSA, SNA or SOCK);
0 value of the context key;
logon target transaction/application.

The browser component 10-2 sends the request via the HTTP protocol to the TPG component 10-4 in a conventional manner (i.e., block 400 of FIG. 4a). The TPG component 10-4 listening on the configured port (e.g. 8080) receives the input connection request and examines the URL's context field value (i.e., block 402). The specific coding of this value enables the component 10-4 determine if browser component 10-2 has requested that a new session connection be opened or has requested that an existing session connection is to be used for forwarding the request to server system 20. As indicated in block 404, TPG component 10-4 examines the context field value and in this case, sees that it has a value of zero. This indicates that no context for this session exists (i.e., no session connection has been established).

As indicated in block 406 of FIG. 4a, TPG component 10-4 opens a new persistent session connection to server system 20 using the protocol specified in the server address field of the URL (i.e., DSA in this example). This is done by invoking a connection function within the browser request processing component 10-40 of FIG. 2. In the simplest case, the HTTP protocol (i.e., SOCK) could also be specified where the host system (i.e.,server system 20) includes the capability of utilizing this protocol.

The TPG component 10-4 also records the pertinent session information as an entry in the PST table 10-48 as follows:

```
class DSAContextEntry {
    private dsa_connection connection = null;   // connection object
    private String    connName       = null;    // connection obj name
    private long      connIndex      = 0;       // connection obj index
    private long      time           = 0;       // TOD session was
created
    private boolean   sessionOpen    = false;   // session state
    private String    appval         = "0";     // value supplied by app
    private long      lastAccessTime = 0;       // TOD for time-out
}
```

Next, the TPG component 10-4 generates a unique context key value. The context key value consists of the following three parts: (X) Time of day in milliseconds as required for uniquely identifying the PST session entry; (Y) Token to access the session entry in the PST table 10-48 and (Z) Optional server application specific value which can be used to invalidate an HTML link.

As previously discussed, the server application value (Z) can be used by an application to invalidate links on "back" browser pages and to prevent requests being made from "bookmarked" pages. The value of Z is updated in the PST table 10-48 by TPG component 10-4 each time a response is sent from the server system 20 to the client system 10. If a new BASE is generated by the TPR application with the new Z value, the browser component 10-2 will build a page using the new BASE. This means that relative links on the new page will be built using the new context and, more specifically, the new Z value. Subsequent requests from the browser component 10-2 with a Z value other than the current Z value in the PST table 10-48 (that is, build with an out-of-date context) will be rejected. Thus, only links with the latest context are considered valid.

Also, as indicated in block 406, TPG component 10-4 generates a pseudo HTTP header having the format:
logon context=x.y.z
<nl>
 where logon in the present example is the target application obtained from the URL and specifies the transaction routine (i.e. logon TPR 20-2a) to be run on server system 20. Next, TPG component 10-4 forwards the HTTP header and body from the browser component 10-2 to server system 20 as indicated in block 406 (i.e., item 2 in FIG. 4b). The browser request processing component 10-40 forwards the request using the persistent session connection in the process of being established on the client system 10 by the TPG component 10-2. To complete the persistent session connection, as discussed herein, the server system 20 cooperates by furnishing a base tag value that enables complete identification of the session connection by both systems.

Figure 4B:
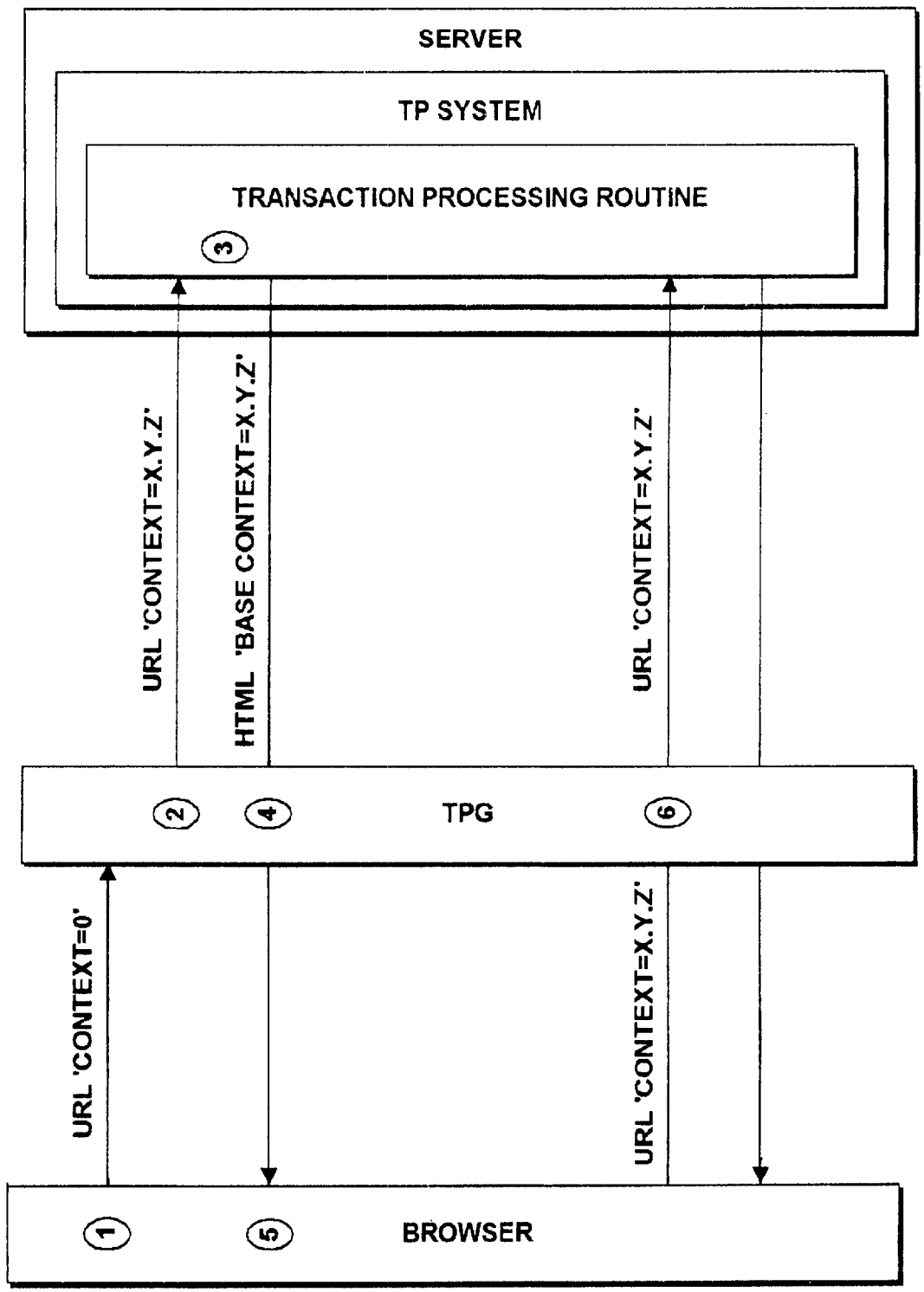

As indicated in block 408, upon receipt of the transaction name (i.e., logon), server system 20 invokes the logon transaction processing routine (TPR) 20-2a (i.e., item 3 in FIG. 4b). The TPR 20-2a during its normal processing constructs an HTML response. Part of this response includes an HTML BASE tag that incorporates the context key. The TRP 20-2a does this by calling the BASE routine contained in API library 20-6. The server system 20 sends the response to TPG component 10-4 over the established persistent session connection (item 4 in FIG. 4b).

As indicated in block 410, the response processing component 10-42 of TPG component 10-4 forwards the server system response to browser component 10-2 via the HTTP protocol over a non-persistent connection established via "sockets" (item 5 in FIG. 4b). The component 10-42 forwards the BASE tag to component 10-40. As indicated in block 412, using the BASE tag, browser component 10-2 resets the base URL in a standard manner. The result of this operation is that any link that the user selects will cause the browser component 10-2 to form an address based on the reset URL base and the link information. Thus, link addresses will have URLs that contain the context key.

When the user selects a link address via mouse 10-11 and submits a subsequent request, browser component 10-2 passes an non-zero context key value to the TPG component 10-4 (item 6 in FIG. 4b). As a result, as indicated in block 414, TPG component 10-4 uses the non-zero context value (i.e., x.y.z) to locate the session information pertaining to the persistent connection in the PST component 10-48. The TPG component 10-4 passes the data received from browser component 10-2 to server system 20 over the persistent session connection located by the context key value (item 6 in FIG. 4b).

As indicated in FIG. 4a, this cycle of operation is repeated during the execution of a transaction processing application program (e.g. TPR 20-2*b*). Upon completing the processing of all required transactions, the browser user can then generate a request signaling termination of the session. More specifically, the browser user generates a request to execute a "logoff" TPR (i.e., a request to be disconnected from server system 20).

In greater detail, the browser user enters the following URL:

HTTP://sandpiper:8080/ph45.web8.dsa/x.v.z/logoff where the target transaction/application specified is TPR 20-2*c*. This causes TPG component 10-4 to forward to server system 20, the browser initiated HTTP GET request having the format:

GET/ph45.web8/x.y.z/logoff HTTP/1.0.

This results in server system 20 invoking logoff TPR 20-2*c*. TPR 20-2*c* provides the appropriate response to browser component 10-2 by including a CONTEXT=0 in the response status line, i.e., HTTP/1.0 200 CONTEXT=0. This is the signal from the host system to TPG component 10-4 to close the session.

The TPG component 10-4 passes the server system's response to browser component 10-2. In addition, TPG component 10-4 closes the browser socket connection used for communicating with browser component 10-2. Also, when such session closing takes place, TPG component 10-4 removes the session entry information form PST table component 10-48.

Also, the session may be closed by TPG component 10-4 because of browser user inactivity or by server system 20 via sending a close response. In the case of inactivity, if no traffic is seen on a session over a specified time interval, the session is considered to be inactive. In the preferred embodiment, a default time-out interval of 10 minutes is established by TPG component 10-4 but this value can be varied administratively. For example, the value can be established by accessing an administrative page via a pre-defined port (e.g. port 8081) associated with TPG component 10-4.

The described technique of using a context key value allows TPG component 10-4 to map a non-persistent session between browser component 10-2 and TPG component 10-4 to a persistent session connection between TPG component 10-4 and server system 20.

Additional Persistent Session Related Options

As indicated above, the TPG component 10-4 of the preferred embodiment may include additional options that can be selected by browser users for use in different operating environments. More specifically, an option word in the URL is used to control additional options. These options include session multiplexing and session pooling.

The format of the URL with the option field is as follows:

<TPG address>/<server add1>.<server add2>.<protocol>.<options>/context/command where options are:

p=pool and m=multiplex.

The "p" option flag designates when a browser user has enabled the use of a session connection from a "session pool".

During TPG component 10-4 startup, a predetermined number of session connections per server is established. The TPG component 10-4 tracks the session connections in a session pool table that indexes entries in the PST table 10-48. As browser component 10-2 requests are serviced, URLs with contexts which indicate new session connections (context=0) are allocated session connections by TPG component 10-4 from the session pool if the "p" option is set. When the server system 20 indicates that the session connection is to be closed, TPG component 10-4 returns the session connection to the session pool.

The session pool can be administratively expanded or contracted according to usage within preset minimum and maximum limits.

The "m" option designates when a browser user has enabled use of a session that can be multiplexed over persistent session connections. When a request is received with the "m" option set, TPG component 10-4 attempts to locate a connection for the same server system (e.g. within PST table 10-48) which is not busy and for which the "m" flag is set or the connection is not is use. When using this option, additional software is required to be installed on the server system to demultiplex sessions and to route messages appropriately.

From the above, it is seen how the TPG component of the preferred embodiment according to the teachings of the present invention manages persistent session connections in response to browser user requests in a manner that provides high performance. Also, the TPG component provides further performance improvements, such as handling remote forms, managing and providing session connection pool and multiplex options and providing a variety of different communications protocols. By utilizing URLs in conjunction with such different capabilities, a client system browser user has the ability to adapt the client system to accommodate traffic demands and different operating environments. For example, a browser user may select a number of different communications protocols in handling different requests involving different host/server systems. In response to such selections, the TPG component would generate a corresponding number of different session objects (e.g. DSA session, SNA session objects) for carrying out such communications in accordance with the teachings of the present invention.

The foregoing discussion of the present invention has been presented for the purposes of illustration and description. Further descriptions are also provided in the Appendix. Such descriptions are not intended to limit the teachings of the present invention to the forms and implementations disclosed herein. Consequently, many variations and modifications commensurate with the above teachings, within the skill and knowledge of the relevant art, are within the scope of the present invention. For example, the teachings of the present invention should not be limited to the types of protocols disclosed, the type of client system and server systems described or to the specific type of software disclosed herein.

Express Mail Label No.
EL_ _644777US
52-3130

APPENDIX
I. Class Diagrams and Program Flow
II. Remote Forms Protocol
III. GTEA component 10-5
IV. API library 20-6

Express Mail Label No.
EL__5644777US
52-3130

-34-

1. Class Diagrams and Program Flow

As previously indicated, the preferred embodiment of the TPG component 10-4 of present invention is constructed as a set of cooperating objects using well-known patterns to facilitate flexibility and to readily enable such features as the ability to dynamically
5  specify a per-session protocol. The use of well-known patterns is described in the text by Gamma, Erich et al entitled "Design Patterns: Elements of Reusable Object-Oriented Software", published by Addison-Wesley, 1995.

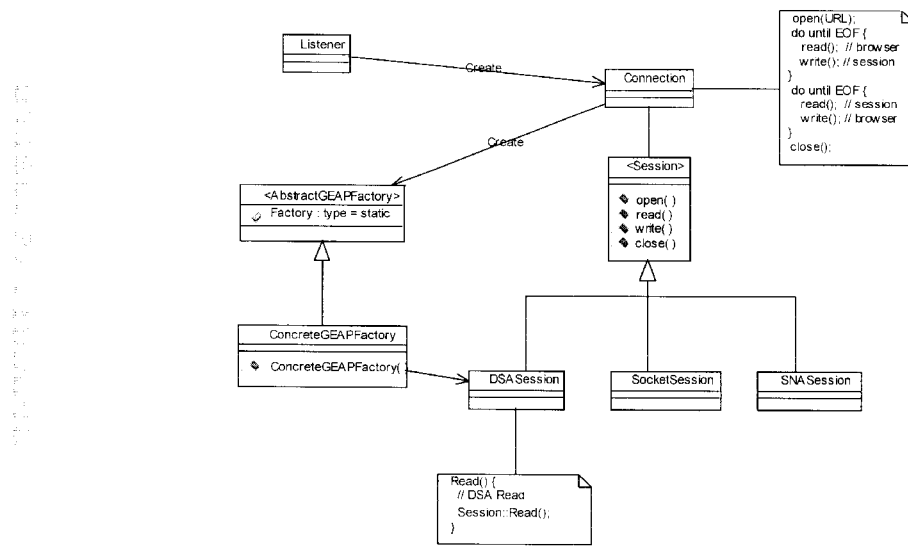

10  Diagram A: Principle TPG Classes

The diagrams contained herein illustrate the specific classes used in implementing TPG component 10-4. More specifically, diagram A shows the principal TPG component classes.

Express Mail Label No.
EL__5644777US
52-3130
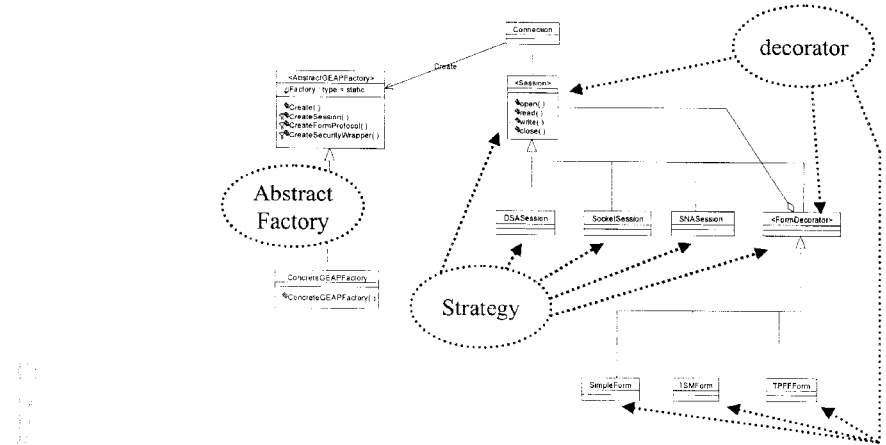
Diagram B: Patterns used in TPG
Diagram B shows some of the patterns used and diagram C shows some addition classes including remote form classes.

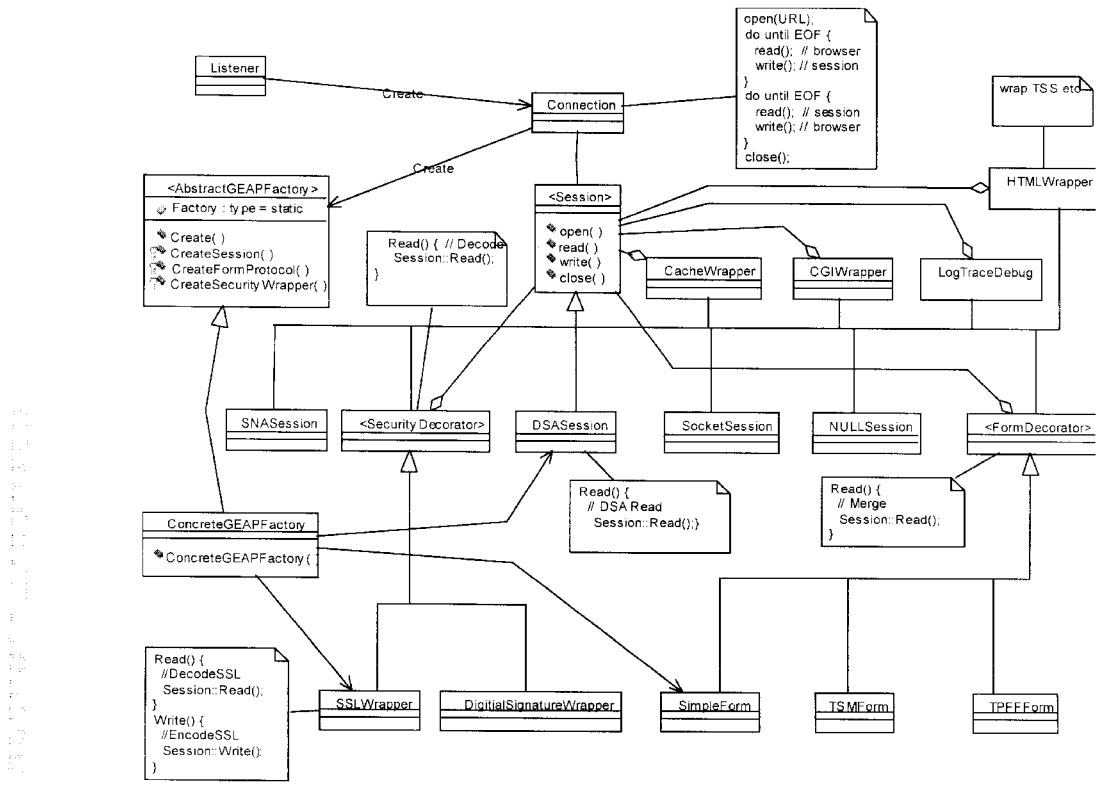

Diagram C: Some addition TPG classes including remote form classes.

Diagrams A through C use a popular OO design notation called Unified Modeling Language (UML) to illustrate class relationships. For further information about such notation, reference may be made to the text by Pierre-Alain Muller, entitled "Instant UML", published by Wrox Press Ltd, 1997.

To give a better understanding or "feel" of the flow of TPG component 10-4, a partial trace of the execution of TPG component 10-4 is illustrated in below. The intent Express Mail Label No.
EL__5644777US
52-3130

-37- is to indicate the flow of TPG component 10-4 and to illustrate some of the class/object and protocol interaction.

By way of background, TPG component 10-4 is composed of a set of the following co-operating objects.

A *Listener* or main object listens on a configurable port for incoming connections from a browser. The *Listener* object, upon receiving a connection, creates a *Connection* object. The *Connection* object creates a *Factory* object.
The *Connection* object calls the *Factory* Create method passing it the URL received from the browser component 10-2. The *Factory* object creates a *DSASession* object.

TPG component 10-2 uses Strategy, Decorator, and Abstract Factory patterns to ensure that the design is open to extension. Additional functions can be added to TPG component 10-4 without changing existing classes. The only change is the Factory class so that the Factory can build the new objects. It will be appreciated that no change would be necessary if the "Factory" object was driven from a configuration file. However, since configuration files cause other problems, this approach is not used.

As illustrated herein, to extend TPG component 10-4, it is only necessary to write a new class which implements the new functionality, tell the Factory about the new class and add the classes to the class library.

The SocketSession Class handles TCP/IP communications between browser component 10-2 and TPG component 10-4. The class can be used to also handle communications between TPG component 10-4 and a standard (i.e. non-proprietary) HTTP Web server.

TPG component 10-4 is capable of receiving multiple overlapping requests from the same browser component. TPG component 10-4 processes multiple simultaneous requests with the same context by serializing the requests in the case of *DSASession*. The *Connection* object will queue and dequeue the requests. The dequeue method is an abstract method that is implemented for each session type derived class. In this way, the decision to serialize or not is implemented by each derived session class.

Express Mail Label No.
EL235644777US
52-3130

-38-

The following edited trace and screen-shots show a session where a users logs on, executes a query and logs off.

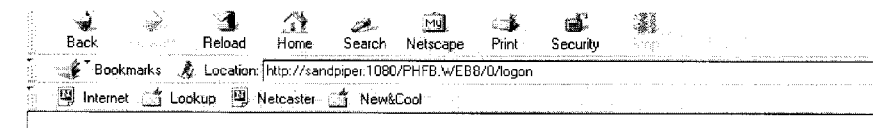

Diagram 1 : User enters URL for initial screen

```
16:32:48  main       Listener: listening on port 1080
16:33:27  Thread-1   New connection opened on port: 2432 Local port: 1080
16:40:12  Thread-1   Connection.constructor: new thread 16:40:12  Thread-19  Connection.run:
16:40:12  Thread-19  ErrorMessage.init(): out = java.io.DataOutputStream@24fe49, in =
java.io.DataInputStream@24fe46
16:40:12  Thread-19  GET /PHFB.WEB8/0/logon HTTP/1.0
16:40:12  Thread 19  Form.open : GET /PHFB.WEB8/0/logon HTTP/1.0
16:40:12  Thread-19  DataCache.open : GET /PHFB.WEB8/0/logon HTTP/1.0
16:40:12  Thread-19  DataCache.open calling next wrapper:
com.bull.GEAP.DSASession@24fa3f
16:40:12  Thread-19  DSASession.open  : GET /PHFB.WEB8/0/logon HTTP/1.0
16:40:12  Thread-19  DSASession.open  : context[0] = 0
16:40:12  Thread-19  DSASession.openNewSession  calling DSA open: conn = null
16:40:12  Thread-19  DSASession.openNewSession  opening DSA session: IP = PHFB, node = ,
mailbox = WEB8, turn = false
16:40:12  Thread-19  * ConTextEntry *
16:40:12  Thread-19  ** connection = com.bull.tcpdsa.dsa_connection@24f2fb
16:40:12  Thread-19  ** time        = 907605612255
16:40:12  Thread-19  put: entry = com.bull.GEAP.ContextEntry@24e831
16:40:12  Thread-19  Connection.run:  : HTTPMethod: GET 16:40:12  Thread-19  Connection.run:  *** reading and sending browser header ***

16:40:12  Thread-19  Connection.run:  calling write (23): GET /0/logon HTTP/1.0
16:40:12  Thread-19  Form.write (string)  calling next wrapper:
com.bull.GEAP.DataCacheSession@24f9c7
16:40:12  Thread-19  DataCache.write (string)  calling next wrapper:
com.bull.GEAP.DSASession@24fa3f
16:40:12  Thread-19  DSASession.write (string): writing (68): logon
CONTEXT=24f2fb.d3518296df
GET /PHFB.WEB8/0/logon HTTP/1.0

16:40:12  Thread-19  Connection.run:  calling write (87): Referer:
http://sandpiper:1080/PHFB.WEB8/24f405.d351822dfe.3618E7BC/logoff/logoff.htm
16:40:12  Thread-19  Form.write (string)   line = Referer:
http://sandpiper:1080/PHFB.WEB8/24f405.d351822dfe.3618E7BC/logoff/logoff.htm
16:40:12  Thread-19  Form.write (string)  calling next wrapper:
com.bull.GEAP.DataCacheSession@24f9c7
16:40:12  Thread-19  DataCache.write (string)  calling next wrapper:
com.bull.GEAP.DSASession@24fa3f
16:40:12  Thread-19  DSASession.write (string): calling next wrapper:
com.bull.GEAP.NULLSession@24faa6
```

E ss Mail Label No.
E1295644777US
52-3130

-39-

```
16:40:12  Thread-19  DSASession.write (string):  writing (87): Referer:
http://sandpiper:1080/PHFB.WEB8/24f405.d351822dfe.3618E7BC/logoff/logoff.htm
16:40:12  Thread-19  Connection.run:   calling write (24): Connection: Keep-Alive
16:40:12  Thread-19  Connection.run:   calling write (43): User-Agent: Mozilla/4.5b2 [en]
(WinNT; I)
16:40:12  Thread-19  Connection.run:   calling write (22): Host: sandpiper:1080
16:40:12  Thread-19  Connection.run:   calling write (77): Accept: image/gif, image/x
xbitmap, image/jpeg, image/pjpeg, image/png, */*
16:40:12  Thread-19  Connection.run:   calling write (23): Accept-Encoding: gzip
16:40:12  Thread-19  Connection.run:   calling write (21): Accept-Language: en
16:40:12  Thread-19  Connection.run:   calling write (36): Accept-Charset: iso-8859-
1,*,utf-8
16:40:12  Thread-19  Connection.run:   writing <CRLF>
16:40:12  Thread-19  DSASession.write (string):  writing (25): Accept: text/geapform
16:40:12  Thread-19  Connection.run:   ***** reading and sending browser body *****
16:40:12  Thread-19  Connection.run:    contentLength = 0
16:40:12  Thread-19  DSASession.turn: updating time-out value907605612665
16:40:12  Thread-19  Connection.run:   ***** reading and sending server response *****
16:40:12  Thread-19  Form.readLine:
16:40:12  Thread-19  Form.readLine:   calling next wrapper:
com.bull.GEAP.DataCacheSession@24f9c7
16:40:12  Thread-19  DataCache.read (string)
16:40:12  Thread-19  DataCache.read (string)  calling next wrapper:
com.bull.GEAP.DSASession@24fa3f
16:40:12  Thread-19  DSASession.readLine():
16:40:12  Thread-19  DSASession.byte[] readDSA():  line = HTTP/1.0 200 CONTEXT=3618E7D7
Content-type: text/html
Pragma: no-cache <html><head>
<title>WEB8 Logon accepted</title>
<base href="http://sandpiper:1080/PHFB.WEB8/24f2fb.d3518296df.3618E7D7/">
</head>
<body><h1>WEB8 Logon Accepted</h1><hr>
Your WEB8 Logon has been processed.  Click <a href="file/default.html">here</a> for
additional options.</body>
</html>

16:40:12  Thread-19  DSASession.readLine():  token = HTTP/1.0 200 CONTEXT=3618E7D7
16:40:12  Thread-19  Connection.run:  writeBytes(): writing to browser: HTTP/1.0 200
CONTEXT=3618E7D7
16:40:12  Thread-19  DSASession.readLine():  token = Content-type: text/html
16:40:12  Thread-19  Connection.run:  writeBytes(): writing to browser: Pragma: no-cache
16:40:12  Thread-19  Connection.run:   ***** reading and sending server body *****
16:40:12  Thread-19  Connection.run:   : content len = 0, reading from server
16:40:12  Thread-19  DSASession.byte[] read():
16:40:12  Thread-19  Form.[]read:  back from wrapper:
com.bull.GEAP.DataCacheSession@24f9c7
16:40:12  Thread-19  <html><head>
<title>WEB8 Logon accepted</title>
<base href="http://sandpiper:1080/PHFB.WEB8/24f2fb.d3518296df.3618E7D7/">
</head>
<body><h1>WEB8 Logon Accepted</h1><hr>
Your WEB8 Logon has been processed.  Click <a href="file/default.html">here</a> for
additional options.</body>
</html>

16:40:12  Thread-19  Connection.run:  write(): writing to browser: 295
16:40:12  Thread-19  Connection.run:   contentLength = 0
16:40:13  Thread-19  Connection.run:   End task
```

Express Mail Label No.
EL295644777US
52-3130

-40-

Diagram 2: User clicks *here* for options

```
16:41:20  Thread-1   New connection opened on port: 2472 Local port: 1080

16:41:20  Thread-20  GET /PHFB.WEB8/24f2fb.d3518296df.3618E7D7/file/default.html HTTP/1.0
16:41:20  Thread-20  DSASession.open   : GET
/PHFB.WEB8/24f2fb.d3518296df.3618E7D7/file/default.html HTTP/1.0
16:41:20  Thread-20  DSASession.processContext  context = 24f2fb.d3518296df.3618e7d7
16:41:20  Thread-20  *context table*
16:41:20  Thread-20  *connIndex   : 2421499
16:41:20  Thread-20  *Connection  : 24f2fb
16:41:20  Thread-20  *Time        : d3518296df
16:41:20  Thread-20  *Sequence    : 3618E7D7
16:41:20  Thread-20  *LastAccess  : 907605612255
16:41:20  Thread-20  get: key = 2421499
16:41:20  Thread-20  DSASession.processContext  retrieved conn =
com.bull.tcpdsa.dsa_connection@24f2fb
16:41:20  Thread-20  NULLSession.open : GET
/PHFB.WEB8/24f2fb.d3518296df.3618E7D7/file/default.html HTTP/1.0
16:41:20  Thread-20  Connection.run:   ***** reading and sending browser header *****
16:41:20  Thread-20  Connection.run:   calling write (60): GET
/24f2fb.d3518296df.3618E7D7/file/default.html HTTP/1.0
16:41:20  Thread-20  DSASession.write (string):  writing (104): file
CONTEXT=24f2fb.d3518296df GET /PHFB.WEB8/24f2fb.d3518296df.3618E7D7/file/default.html HTTP/1.0
16:41:20  Thread-20  Connection.run:   calling write (24): Connection: Keep-Alive
16:41:20  Thread-20  Connection.run:   calling write (22): Host: sandpiper:1080
16:41:20  Thread-20  Connection.run:   calling write (77): Accept: image/gif, image/x-
xbitmap, image/jpeg, image/pjpeg, image/png, */*
16:41:20  Thread-20  Connection.run:   calling write (23): Accept-Encoding: gzip
16:41:20  Thread-20  Connection.run:   calling write (21): Accept-Language: en
16:41:21  Thread-20  Connection.run:   calling write (36): Accept-Charset: iso-8859-
1,*,utf-8
16:41:21  Thread-20  Connection.run:   writing <CRLF>
16:41:21  Thread-20  Form.write (string)   line = Accept: text/geapform
16:41:21  Thread-20  DSASession.write (string): writing (25): Accept: text/geapform
16:41:21  Thread-20  Connection.run:   ***** reading and sending browser body *****
16:41:21  Thread-20  DSASession.turn: updating time-out value907605681084
16:41:21  Thread-20  Connection.run:   ***** reading and sending server response *****
16:41:21  Thread-20  Form.readLine: calling next wrapper:
com.bull.GEAP.DataCacheSession@2583ac
```

Express Mail Label No.
EL295644777US
52-3130

-41-

```
16:41:21  Thread-20  DataCache.read (string)  calling next wrapper:
com.bull.GEAP.DSASession@25844f
16:41:21  Thread-20  DSASession.byte[] readDSA():  line = HTTP/1.0 200 OK
Content-type: text/html
Pragma: no-cache
Date: Mon, 05 Oct 1998 15:39:08 GMT
Last-Modified: Tue, 07 Jul 1998 22:50:03 GMT <!DOCTYPE HTML PUBLIC "-//IETF//DTD HTML//EN">
<html>

<head>
<title>WEB8 default start page</title>
</head>

<body text="#000000" link="#0000FF">

<h1>DEFAULT.HTML - WEB8 default start page</h1>

<hr>

<p>This page was displayed because the URL did not specify a
specific document name. Like most WEB servers, the DOCS TPR will etc..

16:41:21  Thread-20  DSASession.readLine():  token = HTTP/1.0 200 OK
16:41:21  Thread-20  HTTP/1.0 200 OK
16:41:22  Thread-20  Connection.run:  End task
```

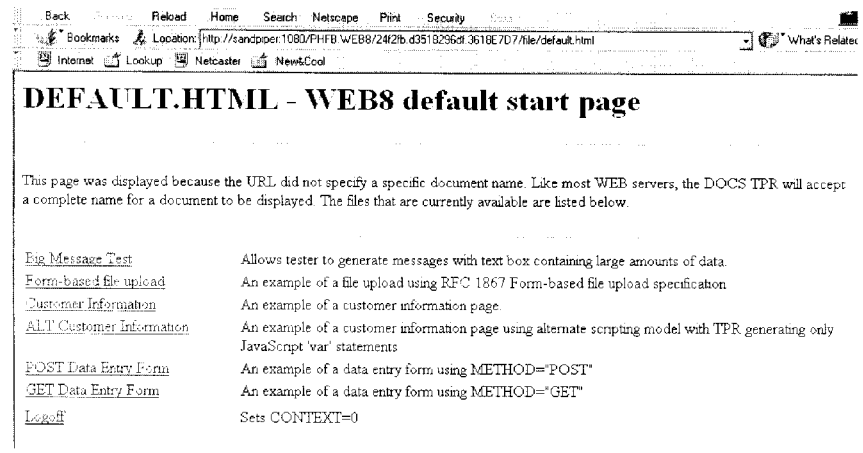

Diagram 3: User selects *Customer Information*

```
16:42:3  Thread-21  GET /PHFB.WEB8/24f2fb.d3518296df.3618E7D7/file/custinfo.htm HTTP/1.0
16:42:3  Thread-21  DSASession.processContext   context = 24f2fb.d3518296df.3618e7d7
16:42:3  Thread-21  DSASession.processContext   retrieved conn =
com.bull.tcpdsa.dsa_connection@24f2fb
```

Express Mail Label No.
EL295644777US
52-3130

-42-

```
16:42:3   Thread-21  Connection.run:  ***** reading and sending browser header *****
16:42:3   Thread-21  DSASession.write (string):  writing (104): file
CONTEXT=24f2fb.d3518296df GET /PHFB.WEB8/24f2fb.d3518296df.3618E7D7/file/custinfo.htm HTTP/1.0

16:42:3   Thread-21  Connection.run:  *** reading and sending browser body ***
16:42:3   Thread-21  Connection.run:  ***** reading and sending server response *****
16:42:4   Thread-21  DSASession.byte[] readDSA():  line = HTTP/1.0 200 OK
16:42:4   Thread-21  Connection.run:  writeBytes(): writing to browser: HTTP/1.0 200 OK
16:42:4   Thread-21  Connection.run:  ***** reading and sending server body *****
16:42:5   Thread-21  Connection.run:  End task
```

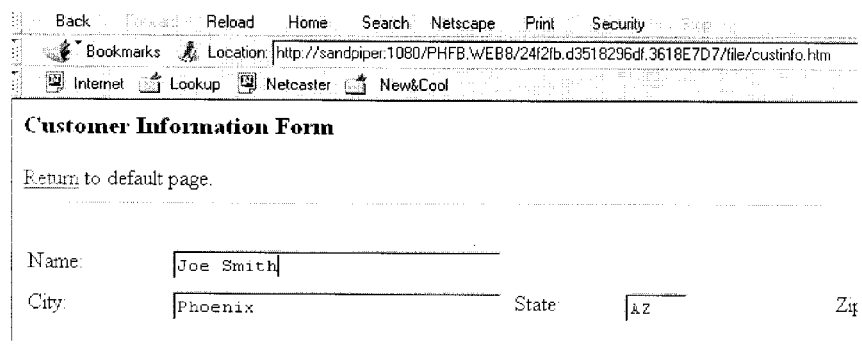

Diagram 4: Users *Returns* to mail page

```
16:42:51  Thread-22  GET /PHFB.WEB8/24f2fb.d3518296df.3618E7D7/file/default.html HTTP/1.0
16:42:51  Thread-22  Connection.run:  ***** reading and sending browser header *****
16:42:51  Thread-22  DSASession.write (string):  writing (104): file
CONTEXT=24f2fb.d3518296df GET /PHFB.WEB8/24f2fb.d3518296df.3618E7D7/file/default.html HTTP/1.0

16:42:51  Thread-22  NULLSession.write(string : Referer:
http://sandpiper:1080/PHFB.WEB8/24f2fb.d3518296df.3618E7D7/file/custinfo.htm 16:42:52  Thread-22  Connection.run:  *** reading and sending browser body ***
16:42:52  Thread-22  Connection.run:  *** reading and sending server response ***
16:42:52  Thread-22  DSASession.byte[] readDSA():  line = HTTP/1.0 200 OK
Content-type: text/html
Pragma: no-cache
...
16:42:52  Thread-22  Connection.run:  writeBytes(): writing to browser: HTTP/1.0 200 OK
16:42:53  Thread-22  Connection.run:  ***** reading and sending server body *****
16:42:53  Thread-22  Connection.run:  write(): writing to browser: 1849
16:42:53  Thread-22  Connection.run:  End task
16:43:39  Thread-1   New connection opened on port: 2478 Local port: 1080
16:43:39  Thread-1   Connection.constructor:
16:43:39  Thread-1   Connection.constructor:  new thread
```

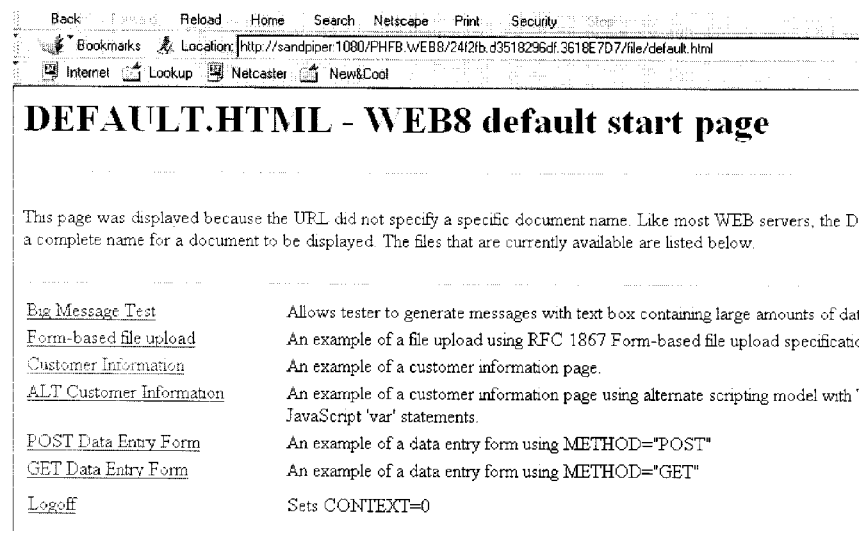

Diagram 5: User selects *Logoff*

```
16:43:39  Thread-23  GET /PHFB.WEB8/24f2fb.d3518296df.3618E7D7/logoff/logoff.htm HTTP/1.0

16:43:39  Thread-23  Connection.run:  ***** reading and sending browser header *****
16:43:39  Thread-23  DSASession.write (string):  writing (106): logoff
CONTEXT=24f2fb.d3518296df GET /PHFB.WEB8/24f2fb.d3518296df.3618E7D7/logoff/logoff.htm HTTP/1.0
16:43:39  Thread-23  Connection.run:  *** reading and sending browser body ***
16:43:39  Thread-23  Connection.run:  ***** reading and sending server response *****
16:43:40  Thread-23  DSASession.byte[] readDSA():  line = HTTP/1.0 200 CONTEXT=0
Content-type: text/html <!DOCTYPE HTML PUBLIC "-//IETF//DTD HTML//EN">
<html>

<head>
<meta http-equiv="Content-Type"
content="text/html; charset=iso-8859-1">
<meta name="GENERATOR" content="Microsoft FrontPad 2.0">
<title>WEB8 Logged off</title>
<base href="http://sandpiper:1080/PHFB.WEB8/0/"></head>

<body bgcolor="#FFFFFF">

<h1>WEB8 Logged off </h1>
```

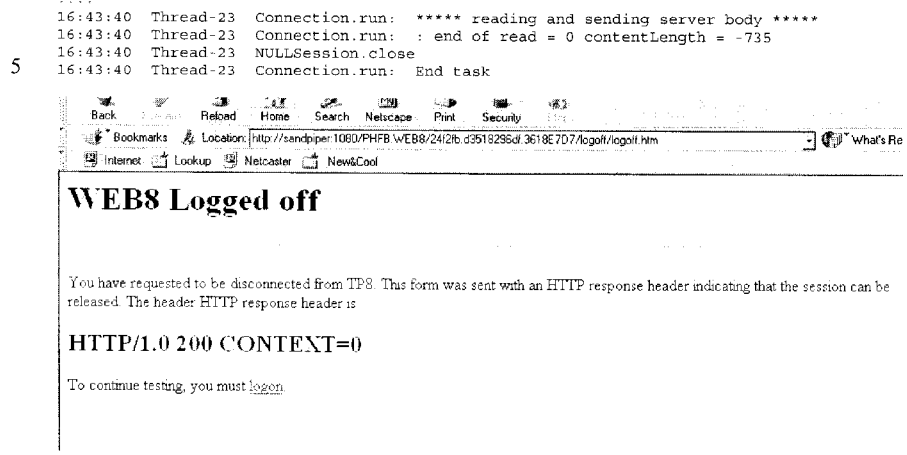
Diagram 6: User logged off

Express Mail Label No.
EL295644777US
52-3130

-45-

II. Remote Forms Protocol

Remote forms allow TPG component 10-4 to cache HTML pages on the client system 10. This can be advantageous in reducing network traffic.

In a response to a request from browser component 10-2, a server application (e.g. TPR 20-2b) can request a "form" (a form is an HTML sequence) to be loaded from a local TPG cache 10-6. If the form is not present in the cache 10-6, TPG component 10-4 will open a session connection to a "form" server program running on system 20 and request the form. When the form is received from the server system 20, TPG component 10-4 will cache the form, merge the form with any data that was sent with the original form request and send the result to the browser component 10-2.

Figure 5:
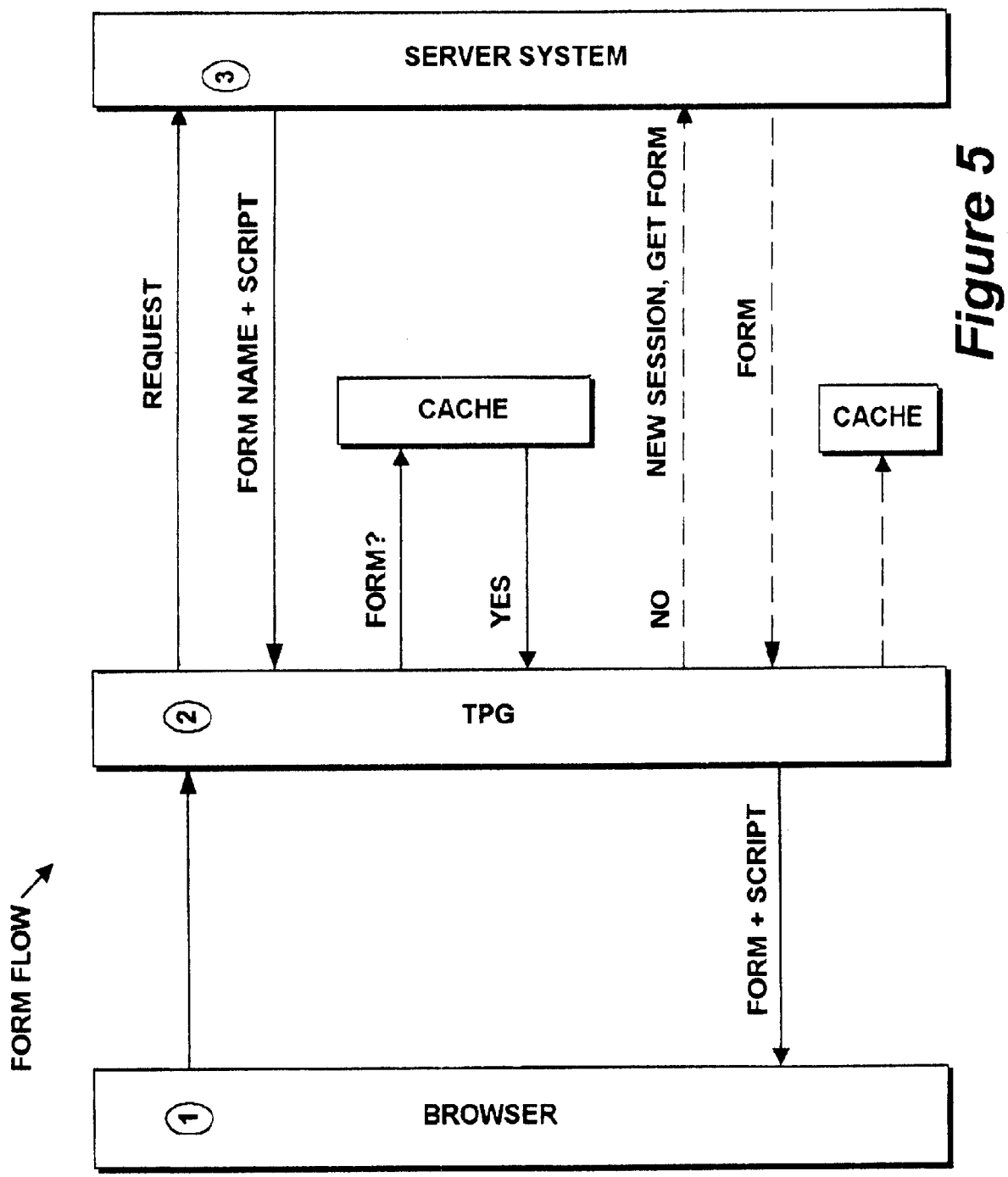
FIG. 5 is a diagram illustrating the protocol utilized in processing remote forms according to the teachings of the present invention.

The form flow is depicted in Figure 5. The browser component 10-2 (1) makes a request in the normal manner. The following HTTP line is added to the request by TPG component 10-4 (2):

```
Accept: text/tpgform.
```

This informs the server application (e.g. TPR 20-2b) that the client system 10 is capable of handling forms. The request is sent to the server system 20 (3) by TPG component 10-4 (2). If the server application (3) determines that a form is required as part of the response, it encodes a request for a form by sending the following HTTP content-type in the response followed by the form variable data:

```
Content-type: text/tpgform; name=<form name>, version=<date>
An example of such a request is:
    Content-type: text/tpgform; name=myform,
            version="TUE, 04 aug 1998 17:20:05 GMT"
where the version is optional.
```

This informs TPG component 10-4 that a particular form is being requested. TPG component 10-4 checks the directory of its cache 10-6 for the form. A form is considered "found" if the name of the form matches a cache entry and if the versions match. If no version is present on the request, then any version or no version will match. There can only be one version of a particular form in the cache 10-6. If the form is found, it is merged with the variable data and sent to the browser component 10-2.

E[xpre]ss Mail Label No.
EL[..]5644777US
52-3130

If the form is not found in the cache 10-6, TPG component 10-4 opens a new session to the "form" server. The following request is sent by TPG component 10-4 to the server system 20 for the form as follows:

```
GET /node.mailbox.protocol/context/command/formname HTTP/1.0
```

The server system 20 responds with the requested form. TPG component 10-4 stores the form in its cache 10-6, deleting any form with the same name and different version, if present. TPG component 10-4 then proceeds as above as if it had found the form in the cache 10-6.

Express Mail Label No.
EL295644777US
52-3130

-47-

III. GTEA Component 10-5

GTEA component 10-5 is a communications layer that supports a set of APIs that allow a program to open and manipulate DSA sessions over TCP/IP using RFC1006.

The following are code examples in C and Java programming languages showing how to initiate a DSA session to server system 20 (e.g. Bull HN Information System's Web8 and timesharing systems), send a command, receive the output and disconnect the session.

A. Example in C Code using GTEA component 10-5 to communicate with server system 20 with DSA over TCP/IP.

```c
#include <stdio.h>
#include <string.h>
#include "tcpd.h"
main(int argc, char **argv) {
    dsa_err e;
    conn_handle c;
    char *p, cmd[80];
    int len;

/* make sure we have a command */
    if (argc < 2) { printf("no command"); exit(1); }
    strcat( strcpy(cmd, argv[1]), "\r");

/* connect to TP8 */
    c = dsa_connect("xxxx", "yyyy", "web8", 0, NULL, NULL, &e);
    if (c <0) { printf("error connect"); exit(1); }

/* send a command and pass the turn */
    dsa_write(c, cmd, strlen(cmd), TRUE, &e);

/* receive output until we get the turn back */
    do {
        if ((p = dsa_read(c, &len, &e)) == NULL) break;
        p[len] = '\0';
        fputs(p, stdout);
    } while (!dsa_have_turn(c));

/* disconnect */
    dsa_close(c, 0);
    return 0;
}
```

B. Example in Java Code using GTEA component 10-5 to communicate with timesharing system using a DSA session over TCP/IP.

```
import java.io.*;
import java.util.*;
import com.bull.tcpdsa.dsa_connection;
import com.bull.tcpdsa.dsaException;

class gcos_connection { public static void main(String argv[])
{
    String ipserver;
    String dsa_mailbox;
    String dsa_node;
    int msg_len;
    byte [] in_msg;
    byte [] out_msg;
    String out_str = null;
    boolean  need_logon=false;
    boolean  trace=false;
    boolean  debug=false;
    String personid = "person";
    String proj_id = "project";
    String billing = null;
    String pw = "xyz";
    DataInputStream din;
      dsa_connection conn;

int i;

if (argv.length < 2) {
        System.err.println("Usage: [-l -d -t] <server> <mbx> [<dsanode>]");
        System.exit(-1);
    } for (i=0; i<=2; i++) {
        if (argv[i].startsWith("-"))
             if(argv[i].compareTo("-l")== 0)
               need_logon = true;
            else if (argv[i].compareTo("-d") == 0)
               debug = true;
            else if (argv[i].compareTo("-t") == 0)
               trace = true;
            else {
              System.err.println("Unknown flag "+argv[3]);
              System.exit(-1);
            }
        else
           break;
    } ipserver = argv[i];
    dsa_mailbox = argv[i+1];
```

Express Mail Label No.
EL...5644777US
52-3130

-49-

```
        if (argv.length > i+2)
            dsa_node = argv[i+2];
        else
            dsa_node = argv[i];

if (debug)
            for(i=0; i<argv.length; i++)
                System.out.println(">>>Arg "+i+" "+argv[i]);

conn = new dsa_connection(debug,trace);
        din = new DataInputStream(System.in);

try {
            conn.dsa_connect(ipserver, dsa_node, dsa_mailbox, conn.VIP7200,
                            personid, proj_id, billing, pw);

while(true) {
            while (!conn.dsa_have_turn()) {
                in_msg = conn.dsa_read();
                if (in_msg == null) {
                    System.out.println("Session terminated");
                    System.exit(0);
                }
                    for (i=0; i<in_msg.length; i++)
                        if (in_msg[i] != (byte) 0x7f) // skip null bytes
                        System.out.write(in_msg[i]);
                    System.out.flush();
            }
            try {
                out_str = din.readLine() + "\r";
                } catch (IOException e) {
                    System.out.println("Error reading input""
                                        + e .toString());
                    System.exit(-1);
                }
            if (out_str.compareTo("$*$BRK\r") == 0)
                conn.dsa_send_attn();
            else {
                out_msg = new byte[out_str.length()];
                out_str.getBytes(0,out_str.length(),out_msg,0);
                conn.dsa_write(out_msg);
            }
        }
        } catch (dsaException e) {
                System.out.println(e.toString());
                System.exit(-1);
        }
    } //end of main()
}
```

E ss Mail Label No.
EL 5644777US
52-3130

IV.   API Library 20-6

The API Library 20-6 contains a number of runtime routines that are called by TPR transaction programs. One of these routines is designated as "HTML_BASE which is called for the purpose of generating a BASE value used in implementing persistent session connections. For further information regarding other runtime routines referenced herein, reference may be made to the previously cited Bull User Manual.

A.   Description of HTML_BASE Runtime Routine

This routine generates an HTML <BASE> element with application context in the form:

```
<BASE href="http://gateway:port/node.mbx/1234.5678.abcd/">.
```

Also, the routine returns the application-context field as a separate string, to be sent by the TPR in the HTTP response header.

1.0   Syntax in C
```
HTML_BASE(base, &cbBase, gwContext, &appContext, &err);
```

1.1   Syntax in COBOL-85
```
CALL "HTML_BASE" USING base, cbBase, gwContext, appContext, err.
```

1.3   Parameters

| | |
|---|---|
| base | Pointer to the character buffer to receive the generated <BASE> element string. On return, base contains a null-terminated string that is suitable for use by C library routines. |
| cbBase | Pointer to an integer (comp-6) that contains the maximum size of the buffer pointed to by base. On return, cbBase contains the actual size of the generated <BASE> element. COBOL-85 programs will use cbBase when processing the resulting base buffer. |
| gwContext | Pointer to a character buffer to receive the appContext converted to a hexadecimal string. The buffer must be eight bytes in length. |

E ss Mail Label No.
EL 5644777US
52-3130

-51-

|  |  |
|---|---|
| appContext | Pointer to an integer (comp-6) that contains the application-defined value to be included in the new <BASE> element. The value of appContext becomes the third field of the session-identifier portion of the base URL. |
| err | Pointer to an integer (comp-6) to receive a value that indicates whether the call was successful. A value of zero indicates a successful call. A negative value indicates that an error occurred. |

1.4 Notes

1. The HTML_BASE routine is used to generate an HTTP response message that sets a base URL for future requests from the browser component. In general, a Web application will provide a logon transaction that uses this routine to establish the base URL for each new connection to TP software. After the logon transaction has established the base URL, all HTML pages generated by the application can use relative URLs to submit transactions over the same session connection.

2. The generated base contains URL elements up to and including the session identifier.

```
   <BASE HREF="http://gateway:port/node.mbx/1234.5678.abcd/">
   ```

3. Relative links that reside on a Web page that contains the <BASE> element specify the next TP command and any optional information; for example:

```
   You are now logged on.
   The <A HREF="nxtcmd/custinfo.htm">Customer Information<A>
    form is now available.
   ```

When a user selects the <u>Customer Information</u> link in the above example, the browser appends the relative-link information that is provided in the <A> tag to the base URL to submit a request for the "nxtcmd" using the full URL as follows:

```
   http://gateway:port/node.mbx/1234.5678.abcd/nxtcmd/custinfo.htm
   ```

4. Error conditions are indicated by placing a negative value in err:

| | |
   |---|---|
   | ERR_HTML_BASE_SIZE | base too small to hold result |
   | ERR_HTML_BASE_CTXFMT | invalid context format in URL: The HTTP request submitted by the browser contains an invalid context string. |
   | ERR_HTTP_GETHDR_xxx | any errors returned by HTTP_GETHDR |

B.  C Example

```
char newbase[256];
```

```
          int   cbBase = sizeof(newbase);
          int   gwContext[8];
          int   appContext = 1;
          int   err;

HTML_BASE(newbase, &cbBase, gwContext, &appContext, &err);

printf("HTTP/1.0 200 CONTEXT=%8.8s\r\n"
              "Content-type: text/html\r\n"
              "Pragma: no-cache\r\n"
              "\r\n"
              "<html><HEAD>\r\n"
              "<TITLE>Web 8 Logon accepted<TITLE>\r\n"
              "%s\r\n"
              "</HEAD>\r\n"
              "<BODY><H1>Logon Accepted</H1><HR>\r\n"
              "You are now logged on. The "
              "<A HREF=\"nxtcmd/custinfo.htm\">Customer Information</A>"
              " form is now available."
              "<BODY>\r\n"
              "</html>\r\n",
              gwContext, newbase
              );
```

C. COBOL-85 Example

```
          data division.

02   basedata pic x occurs 0 to 256 times depending on cbBase.
          procedure division.
              move 256 to cbBase.
              call "HTML_BASE" using base, cbBase, gwContext, appContext, err.
              move 1 to msgPtr.
              string "HTTP/1.0 200 CONTEXT=" gwContext NL
                    "Content-type: text/html" NL
                    "Pragma: no-cache" NL
                     NL
                    "<html><HEAD>"
                    "<TITLE>Web 8 Logon accepted</TITLE>" NL
                     base
                    "</HEAD>" NL
                    "<BODY><H1>Logon Accepted</H1><HR>"
                     NL "You are now logged on. The "
                    "<A HREF=" "nxtcmd/custinfo.htm" ">"
                    "Customer Information</A>" NL
                    " form is now available."
                    "</BODY>"
                    "</html>"
```

Express Mail Label No.
EL295644777US
52-3130

-53-

```
  delimited size into msgText pointer msgPtr.
subtract 1 from msgPtr.
call "HTTP_SEND" using msgText, msgPtr.
```

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A method of efficiently processing requests from a client system to a remotely located server system through a communications network, the method comprising the steps of:
   (a) generating a request by a standard browser component included in the client system to be forwarded to the server system, the request containing a standard URL having a resource name field containing a predetermined field coded to specify a session context value for indicating the type of session connection to be initiated by the client system through the communications network for transferring the request to the server system;
   (b) maintaining a table structure within a transaction protocol gateway (TPG) component included in the client system located between the browser component and the communications network for storing session connection information for identifying each persistent connection established by the gateway component;
   (c) mapping the URL of each input connection request by the gateway component that is received from the browser component to an established persistent session connection when specified by the session context value; and,
   (d) the gateway component transferring each request made by the browser component during a session that contains the mapped URL to the server system over the communications network using the established persistent session connection in lieu of opening a new session connection thereby minimizing network traffic.

2. The method of claim 1 wherein the predetermined field is a session context field coded to specify a first value for designating when a new session connection is to be established by the TPG component.

3. The method of claim 2 wherein the server system includes a facility for generating base tag values to be transferred to the browser component and the method of claim 2 further includes the steps of:
   (d) generating a base tag value by the facility in response to receiving a URL in a browser request containing a context field specifying the first value for transfer to the browser component; and,
   (e) transferring the base tag value including the mapped URL to the browser component for identifying the persistent session connection established by the gateway component.

4. The method of claim 1 wherein the browser component and gateway component communicate using a stateless common application communications protocol such as the hypertext transfer protocol (HTTP).

5. The method of claim 2 wherein for each session context field within the URL resource name field coded to specify the first value, the gateway component generates a unique context key value that uniquely identifies a session entry within the table structure for accessing session connection information pertaining to the particular persistent connection established by the gateway component.

6. The method of claim 4 wherein communication between the browser and gateway components using the stateless common application communications protocol is conducted over a non-persistent connection with a standard internet communications protocol.

7. The method of claim 6 wherein the standard internet communications protocol is TCP/IP.

8. The method of claim 1 further including the steps of:
   (f) the browser component generating a close session request containing a URL whose resource name field is coded for closing the persistent session connection for transmission to the server system; and,
   (g) in response to the close session request, the gateway component accessing the table structure and removing the persistent connection information for the connection identified by the URL predetermined field thereby making the location available for establishing other persistent session connections.

9. The method of claim 8 wherein the browser component generates the close session request in response to a user HTML page selection.

10. The method of claim 8 wherein the browser component generates the close session request in response to a browser user entering a URL whose resource name field specifies a session closure.

11. The method of claim 9 wherein the selection designates a logoff request.

12. The method of claim 10 wherein the resource name field of the URL further contains a command field coded to specify a logoff request.

13. The method of claim 8 wherein the method further includes the steps of:
   (h) the gateway component transferring the browser close session request containing the coded URL command field specifying the logoff request to the server system; and,
   (i) in response the request, the server system closing the session connection and sending a response to the browser component confirming that the session has been closed.

14. The method of claim 13 wherein the method further includes the steps of:
   the gateway component transferring the server response to the browser component for indicating to the user that the session has been closed.

15. The method of claim 2 wherein the method further includes the steps of:
   (k) for each session context field within the URL resource field coded for specifying a new session connection to be established, the gateway component generating for inclusion in the session context field, a unique context key value containing a number of parts, a first part containing a time of day value for uniquely identifying a session entry within the table structure, a second part containing a token value for accessing the session connection information entry within the table structure pertaining to a session connection established by the gateway component and a third portion containing an optional server application specific value for use in invalidating out of date links when selected by a browser user.

16. The method of claim 3 wherein the server system further includes a number of transaction processing application programs (TPRs) for processing browser user requests and wherein the resource name field further includes another part containing an application command value coded for identifying a particular one of the TPRs that is to process the browser request.

17. The method of claim 16 wherein the number of TPRs of the server system include a logon TPR, a number of processing TPRs and a logoff TPR.

18. The method of claim 17 wherein the server system further includes an API library for storing a number of runtime routines to be used in processing HTTP requests generated by the browser component, one of the runtime routines for generating a BASE value for use by the browser component and wherein each TPR includes a call for accessing the one runtime routine for generating a response to the browser HTTP request.

19. The method of claim 1 wherein the client system further includes a service component for converting first type of communications protocol calls into internet communications protocol calls for enabling the first type of communications protocol to run over the internet communications protocol, the service component being operatively coupled to the gateway component and wherein the URL resource name field further contains a protocol field coded to specify the communications protocol to be used in transmitting the request, the method further including the steps of:
  (1) including in the gateway component a number of different session class facilities, each of the class facilities for generating a communications session connection that implements a different type of communications protocol;
  (m) the gateway component invoking a particular one of the communications class facilities in accordance with the coding of the URL resource name protocol field; and,
  (n) the browser selected communications class facility invoking the service component for establishing the persistent connection that implements the browser user specified communications protocol.

20. The method of claim 19 wherein the first type of communications protocol includes a number of different proprietary communications protocols.

21. The method of claim 20 wherein the number of different proprietary communications protocols include DSA and SNA protocols.

22. The method of claim 19 wherein step (m) further includes the step of:
  (o) the gateway component in response each browser request containing a protocol field coded to specify an internet communications protocol invokes one of the class facilities that directly establishes the persistent connection for implementing the specified internet communications protocol thereby eliminating execution of step (n).

23. The method of claim 1 wherein step (a) further includes the steps of:
  including an options field in the URL for specifying different types of user selected persistent connections; and,
  the gateway component as a function of the setting of the option field establishing the type of persistent connection specified by the browser user.

24. The method of claim 23 wherein the different types of persistent connections includes a pool type of connection wherein the browser user can enable use of a session connection from a pre-established, predetermined number of session connections per server system and a multiplex type of connection wherein the browser user can enable use of a session that can be multiplexed over persistent session connections.

25. The method of claim 1 wherein the method further includes the steps of:
  (p) including in the client system, a remote forms cache operatively coupled to the gateway component for storing HTML pages cached by the gateway component, the HTML pages containing static HTML data representative of a number of forms;
  (q) in response to each browser request, the gateway component generating an additional HTTP line for adding to the browser request for informing the server system that the client system is capable of handling forms;
  (r) when a form is required as part of the response to the browser request, generating a predetermined type of HTTP response by the server system that indicates the particular form being requested, followed by form variable data;
  (s) the gateway component upon receiving the server system response searches the cache for the particular form; and,
  (t) when the form is found, the gateway component merges the form with the form variable data.

26. The method of claim 25 wherein step (t) further includes the steps of:
  1. when the particular form is not found, the gateway component establishes a new session connection to the server system;
  2. generates a predetermined HTTP request specifying the particular form; and,
  3. upon receipt of the requested form from the server system, stores the form in the cache and executes step (t).

27. The method of claim 25 wherein a form is deemed found if the name of the form matches a cache directory entry of the cache and if the version specified in the directory entry matches the form version.

28. The method of claim 25 wherein the additional HTTP line is Accept: text/tpgform wherein tpg is used to identify the gateway component.

29. A client system for efficiently processing requests from the client system to a remotely located server system through a communications network, the client system comprising:
  (a) a standard browser component for generating a request to be forwarded to the server system, the request containing a standard URL having a resource name field that includes a predetermined field coded to specify a session context value for indicating the type of session connection to be initiated by the client system through the communications network for transferring the request to the server system; and,
  (b) a gateway component located between the browser component and the communications network, the gateway component for managing and establishing persistent session connections in response to browser requests, the gateway component comprising:
    (1) a table structure for storing session connection information for identifying each established persistent connection made by the client system;
    (2) a component for mapping the standard URL of each input connection request by the gateway component to an established persistent session connection using the table structure when specified by the session context value; and,
    (3) a component for causing the transfer each request made by the browser component during a session that contains the mapped URL to the server system over the communications network using the established persistent session connection in lieu of opening a new session connection thereby minimizing network traffic.

30. The client system of claim 29 wherein the predetermined field is a session context field coded to specify a first value for designating when a new session connection is to be established by the gateway component.

31. The client system of claim 29 wherein the server system includes:
   (1) a facility for generating base tag value in response to receiving a URL resource name field in a browser request containing a context field specifying the first value, for transfer to the browser component; and,
   (2) means for transferring the base tag value including the mapped URL to the browser component for identifying the persistent session connection established by the gateway component.

32. The client system of claim 29 wherein the browser component and gateway component communicate using a stateless common application communications protocol such as the hypertext transfer protocol (HTTP).

33. The system of claim 30 wherein for each session context field within the URL resource name field coded to specify the first value, the gateway component generates a unique context key value that uniquely identifies a session entry within the table structure for accessing session connection information pertaining to the particular persistent connection established by the gateway component.

34. The system of claim 29 wherein the browser component generates a close session request containing a URL whose resource name field is coded for closing the persistent session connection for transmission to the server system and in response to the close session request, the gateway component accesses the table structure and removes the persistent connection information for the connection identified by the URL predetermined field thereby making the location available for establishing other persistent session connections.

35. The system of claim 34 wherein the browser component generates the close session request in response to a user HTML page selection.

36. The system of claim 34 wherein the browser component generates the close session request in response to a user entering a URL whose resource name field is coded for specifying session closure.

37. The system of claim 34 wherein the gateway component transfers the browser close session request containing the coded URL resource name field to the server system; and, in response the request, the server system closes the session connection and sends a response to the browser component confirming that the session has been closed.

38. The system of claim 37 wherein the gateway component transfers the server response to the browser component for indicating to the user that the session has been closed.

39. The system of claim 30 wherein for each session context field coded for specifying a new session connection is to be established, the gateway component generates for inclusion in the session context field, a unique context key value containing a number of parts, a first part containing a time of day value for uniquely identifying a session entry within the table structure, a second part containing a token value for accessing session connection information entry within the table structure pertaining to a session connection established by the gateway component and a third portion containing an optional server application specific value for use in invalidating out of date links when selected by a browser user.

40. The system of claim 31 wherein the server system further includes a number of transaction processing application programs (TPRs) for processing browser user requests and wherein the resource name field further contains another part containing an application command value identifying a particular one of the TPRs that is to process the browser request.

41. The system of claim 40 wherein the number of TPRs of the server system include a logon TPR, a number of processing TPRs and a logoff TPR.

42. The system of claim 41 wherein the server system further includes an API library for storing a number of runtime routines to be used in processing HTTP browser requests, one of the runtime routines for generating a BASE value for use by the browser component and wherein each TPR includes a call for accessing the one runtime routine for generating a response to the browser HTTP request.

43. The system of claim 29 wherein the client system further includes a service component for converting first type of communications protocol calls into internet communications protocol calls for enabling the first type of communications protocol to run over the internet communications protocol, the service component being operatively coupled to the gateway component and wherein the URL resource name field further contains a protocol field coded to specify the communications protocol to be used in transmitting the request to the server system and the gateway component further including:
   a number of different session class facilities, each class facility for generating a communications session connection that implements a different type of communications protocol, the gateway component invoking a particular one of the communications class facilities in accordance with the coding of the URL protocol field; and, browser selected communications class facility invoking the service component for establishing the persistent connection that implements the browser user specified communications protocol.

44. The system of claim 43 wherein the first type of communications protocol includes a number of different proprietary communications protocols.

45. The system of claim 44 wherein the number of different proprietary communications protocols includes DSA and SNA protocols.

46. The system of claim 43 wherein the gateway component in response to each browser request containing a URL resource name field having a protocol field coded to specify an internet communications protocol invokes one of the class facilities that directly establishes the persistent connection for implementing the specified internet communications protocol thereby eliminating execution of step (n).

47. The system of claim 29 wherein an options field is included in the URL resource name field for specifying different types of user selected persistent connections; and,
   the gateway component as a function of the setting of the options field establishing the type of persistent connection specified by the browser user.

48. The system of claim 47 wherein the different types of persistent connections includes a pool type of connection wherein the browser user can enable use of a session connection from a pre-established predetermined number of session connections per server system and a multiplex type of connection wherein the browser user can enable use of a session that can be multiplexed over persistent session connections.

49. The system of claim 29 wherein the client system further includes a remote forms cache operatively coupled to the gateway component for storing HTML pages cached by the gateway component, the HTML pages containing static HTML data representative of a number of forms, the gateway component in response to each request generating an additional HTTP line for adding to the browser request for informing the server system that the client system is capable of handling forms and when a form is required as part of the response to the browser request, the server generates a predetermined type of HTTP response by the server system that indicates the particular form being requested, followed by form variable data.

50. The system of claim 49 wherein the gateway component upon receiving the server system response searches the cache for the particular form and when the form is found, the gateway component merges the form with the form variable data.

51. The system of claim 50 wherein when the particular form is not found, the gateway component establishes a new session connection to the server system, generates a predetermined HTTP request specifying the particular form and upon receipt of the requested form from the server system, stores the form in the cache and continues as if the form had been found.

52. The system of claim 50 wherein a form is deemed found if the name of the form matches a cache directory entry of the cache and if the version specified in the directory entry matches the form version.

53. The system of claim 50 wherein the additional HTTP line is Accept: text/tpgform wherein tpg is used to identify the gateway component.

54. A program product for efficiently processing requests from a client system to a remotely located server system through a communications network, the program product comprising:

a gateway program component program containing instructions for:

generating a request by a standard browser component included in the client system to be forwarded to the server system, the request containing a standard URL having a resource name field containing a predetermined field coded to specify a session context value for indicating the type of session connection to be initiated through the communications network for transferring the request;

maintaining a table structure within a transaction protocol gateway (TPG) component included in the client system and located between the browser component and the communications network for storing session connection information for identifying each persistent connection established by the gateway component;

mapping the URL of each input connection request received from the browser component to an established persistent session connection when specified by the session context value; and, transferring each request made by the browser component during a session that contains the mapped URL to the server system over the communications network using the established persistent session connection in lieu of opening a new session connection thereby minimizing network traffic.

55. The program product of claim 54 wherein the program product further includes:

a service component containing instructions for converting a first type of communications protocol calls into internet communications protocol calls for enabling the first type of communications protocol used for establishing a persistent session connection to run over the internet communications protocol utilized by the browser component.

* * * * *